United States Patent
Theeg et al.

(10) Patent No.: US 12,498,521 B2
(45) Date of Patent: Dec. 16, 2025

(54) FIBER EXIT ELEMENT

(71) Applicant: FIBERBRIDGE PHOTONICS GMBH, Hannover (DE)

(72) Inventors: Thomas Theeg, Seelze (DE); Tony Pulzer, Garbsen (DE)

(73) Assignee: FIBERBRIDGE PHOTONICS GMBH, Jannover (DE)

( * ) Notice: Subject to any disclaimer, the term of this patent is extended or adjusted under 35 U.S.C. 154(b) by 682 days.

(21) Appl. No.: 17/620,227

(22) PCT Filed: Jun. 19, 2020

(86) PCT No.: PCT/EP2020/067248
§ 371 (c)(1),
(2) Date: Dec. 17, 2021

(87) PCT Pub. No.: WO2020/254661
PCT Pub. Date: Dec. 24, 2020

(65) Prior Publication Data
US 2022/0244461 A1    Aug. 4, 2022

(30) Foreign Application Priority Data
Jun. 21, 2019   (DE) .......................... 102019116839.2

(51) Int. Cl.
*G02B 6/26*  (2006.01)
*G02B 6/255* (2006.01)
*G02B 6/32*  (2006.01)

(52) U.S. Cl.
CPC ........... *G02B 6/262* (2013.01); *G02B 6/2551* (2013.01); *G02B 6/2552* (2013.01); *G02B 6/32* (2013.01)

(58) Field of Classification Search
CPC .... G02B 6/262; G02B 6/2552; G02B 6/2551; G02B 6/32; G02B 6/34
See application file for complete search history.

(56) References Cited

U.S. PATENT DOCUMENTS

| 6,819,858 B2 | 11/2004 | Steinberg et al. |
| 6,978,073 B2 | 12/2005 | Yamamoto et al. |

(Continued)

FOREIGN PATENT DOCUMENTS

| JP | 2007065437 A | * | 9/2005 | ............... G02B 6/32 |
| JP | 2007065437   | * | 3/2007 | ............... G02B 6/32 |

(Continued)

OTHER PUBLICATIONS

International Search Report for PCT/EP2020/067248; Sep. 4, 2020; 4 pgs.

*Primary Examiner* — Michael P Mooney
(74) *Attorney, Agent, or Firm* — Perilla Knox & Hildebrandt LLP

(57) ABSTRACT

The present invention relates to a fiber exit element (1), comprising: a plurality of glass fibers (10) each having at least one core (10*a*) which is designed to guide a signal light ray (A); and at least one optical element (14), preferably an optical window (14), an optical lens (14), an optical beam splitter (14) or an optical prism (14), which is connected to each open end (11) of the cores (10*a*) of the glass fibers (10) and is designed to receive the signal light ray (A) from the open ends (11) of the cores (10*a*) of the glass fibers (10) and to output said signal light ray to the outside via at least one exit face (14*b*) as exit rays (A'). The fiber exit element (1) is characterized in that the open ends (11) of the cores (10*a*) of the glass fibers (10), and preferably also the open ends (11) of claddings (10*b*) of the glass fibers (10) substantially enclosing the cores (10*a*), are each arranged within the material of the optical element (14) with a depth of penetration (W), preferably with respect to an incident face (14*a*) of the optical element (14), at least the material of the open ends (11) of the cores (10*a*) of the glass fibers (10), preferably also the material of the open ends (11) of the (Continued)

claddings (10*b*) of the glass fibers (10), being fused to the material of the optical element (14).

19 Claims, 7 Drawing Sheets

(56) References Cited

U.S. PATENT DOCUMENTS

| | | | | |
|---|---|---|---|---|
| 9,864,140 | B2* | 1/2018 | Adler | G02B 27/0911 |
| 2008/0219679 | A1* | 9/2008 | Takada | G02B 6/32 |
| | | | | 398/201 |
| 2012/0045169 | A1 | 2/2012 | Hu et al. | |
| 2018/0059323 | A1 | 3/2018 | Rivera et al. | |

FOREIGN PATENT DOCUMENTS

| | | |
|---|---|---|
| JP | 2007178603 A | 7/2007 |
| JP | 2014191277 A | 10/2014 |

\* cited by examiner

FIBER EXIT ELEMENT

The present invention relates to a fiber exit element according to the preamble of claim 1, to a method for producing a fiber exit element according to claim 18, and to a processing device for producing a fiber exit element according to claim 19.

Nowadays, glass fibers are used in many different technical fields. The use of glass fibers for light transmission belongs to technical and in particular highly technical applications. For example, glass fibers are used for data transmission by means of light; in this case, the glass fibers can also be referred to as optical waveguides or as passive glass fibers. Glass fibers are also used in medicine, for example for lighting and for generating images, for example in microscopes, in inspection cameras and in endoscopes. Furthermore, glass fibers are used in sensors, which can then be referred to as fiber optic sensors.

Another field of application for glass fibers is laser technology. Here, the laser radiation, in the form of signal light radiation, can be conducted by means of a passive glass fiber from a laser radiation source, in the form of a signal light source or a signal light radiation source, to a processing point in order to carry out cutting or welding there, for example in material processing or in medicine. The laser beam, in the form of laser radiation, can also be supplied to a sample in this way, for example in measurement technology, in microscopy or in spectroscopy. Passive glass fibers can be used to conduct a laser beam, for example, in applications in mechanical engineering, in telecommunications, in medical technology and in sensor technology.

Glass fibers can also be used to generate or to amplify laser light and are referred to as active glass fibers. For this purpose, fiber lasers for generating laser light or fiber amplifiers for amplifying laser light have, in portions, a doped fiber core (see below) which forms the active medium of the fiber laser or the fiber amplifier, i.e., the active glass fiber thereof. Usual doping elements of the laser-active fiber core are in particular neodymium, ytterbium, erbium, thulium and holmium. Fiber lasers or fiber amplifiers are used, among other things, in industry for ultrashort pulse laser systems (for example at a wavelength of approximately 1 µm), in measurement technology (for example for lidar measurements—laser detection and ranging), in medical applications (for example at a wavelength of approximately 2 µm) or in space applications (for example at a wavelength of approximately 1.5 µm).

Glass fibers, which are used to amplify the signal light, such as the laser radiation in fiber amplifiers, or to generate laser radiation in fiber lasers, usually have a fiber core, which consists of pure glass, such as pure quartz glass, and in the case of passive glass fibers is often doped with germanium; in the case of active glass fibers, doping as described above is usually used. In particular cases, the fiber cladding can also be doped; this applies to passive and active glass fibers. Depending on the size and the numerical aperture of the fiber core, a distinction can be made between single-mode and multi-mode glass fibers. In addition, the fiber core can also have polarization-maintaining properties for the light, and therefore can be referred to as polarization-maintaining glass fibers (PM). These may also be photonic crystal glass fibers and hollow core glass fibers. Even if the main field of application relates to glass fibers, polymer fibers or fibers made of other materials, for example so-called soft glass fibers for the middle IR range, can also be used for such application(s).

The fiber core is usually surrounded radially on the outside by at least one fiber cladding, which is usually closed in the circumferential direction and thus completely surrounds the fiber core, apart from the two open ends of the glass fiber.

Both passive glass fibers and active glass fibers are usually surrounded by a fiber coating, for example made of polymer, in a manner comparable to the fiber cladding, which coating can then be considered part of the glass fiber. The fiber coating can be used to mechanically protect the glass interior of the glass fiber and influence the optical properties thereof. In the case of glass fibers in which the light is guided exclusively in the fiber core (single-clad glass fibers), the fiber coating is usually used primarily for mechanical protection. Glass fibers which guide light in the fiber core and in the fiber cladding (double-clad glass fibers) are usually designed having a fiber coating in order to fulfil mechanical and optical properties.

Two cross-sectional shapes for the fiber cladding that frequently occur in practice are cylindrical and octagonal. The octagonal shape for the fiber cladding is used in particular in the case of active glass fibers.

Glass fibers of this kind can be produced in large lengths and are usually available on reels. The diameter of the fiber cladding usually varies between approximately 80 µm and approximately 1 mm. In practice, in particular in the case of larger fiber diameters, reference is often made to rod-type fibers.

Four essential passive fiber components are typically required for a fiber amplifier: a signal light ray input in the form of an interface for the feeding in or for the coupling in of the signal light ray to be amplified in the form of input radiation from outside the fiber amplifier; a pump light coupler which transfers the pump light radiation from the pump light source into the cladding of the active glass fiber with almost no loss; a pump light trap, which receives unabsorbed pump light from the active glass fiber or removes said light from the cladding of the glass fiber; and a signal light ray output, which shapes and/or guides the output radiation and thereby decouples it to outside the fiber amplifier and makes it available. The signal light ray output can also be referred to as a fiber exit element or as fiber exit optics.

In the case of a fiber laser, a pump light coupler, an active glass fiber, a pump light trap and a signal light ray output are also usually used. Since no signal light ray is fed in here from outside, but the laser radiation is generated within the fiber resonator between two reflectors or mirror elements, the signal light ray input is omitted.

In any case, an optical window with an anti-reflective coating on one side for the corresponding wavelengths or a lens for collimating the output radiation can be used as the signal light ray output or as the fiber exit element. The fiber exit optics can also be another glass fiber, which guides the output radiation to a destination. Such fiber exit optics are usually integrally connected to the open end of the glass fiber, for example by welding, also called splicing. As a result, the signal light or the laser light can pass directly into the fiber exit optics, for example in the form of an optical window or in the form of a lens, and from there exit to the outside of the fiber amplifier or fiber laser, for example. By means of the optical window or by means of the lens, the beam of the signal light or the laser light can be expanded, i.e., its cross section can be enlarged and its power density reduced, which can be favorable or necessary for particular applications.

It is therefore known to integrally connect an individual glass fiber to an individual fiber exit element, as described above. For many applications, for example in material processing or in medical technology, however, it is appropriate to use a plurality of laser beams in an arrangement that is as spatially compact as possible and, above all, thermally and mechanically highly stable at the place of use. This could be achieved, for example, in free-beam optics with any arrangement of microlenses, but this would mean losing the considerable advantages of glass fiber technology.

If, instead, a plurality of glass fibers are combined with one another, each having an individual fiber exit element, this leads to additional complexity in order to arrange and align the fiber exit elements with respect to one another, so that the respective signal light rays can exit and be used as desired in relation to one another. At the same time, this represents a significant source of errors during assembly, which can lead to a poor or even unusable end product. This also increases the installation space of the end product, at least in the region of the fiber exit elements.

Furthermore, a certain minimum spacing between the individual glass fibers cannot be avoided, this spacing being due to the size of the respective fiber exit elements, which are arranged in parallel with one another and together form the actual fiber exit element.

U.S. Pat. No. 6,819,858 B2 describes a molded mount which is made of non-crystalline polymer material and is configured to have a channel for holding a silicon chip, having a plurality of adjacent V-grooves formed in a top face between right-hand and left-hand side portions thereof, a recessed region being provided in the channel behind the chip for receiving a fiber buffer coating and a notch being formed in a top portion of the mount between the channel and a side portion thereof in order to hold reinforcing fibers of an optical fiber cable, the V-groove being configured such that it receives a relevant individual optical fiber therein. Two such molded mounts having silicon chips are securely stacked together, with the V-grooves of the chips facing each other in order to hold the optical fibers therebetween.

U.S. Pat. No. 6,978,073 B2 describes an optical fiber array comprising an alignment substrate, a plurality of ferrule elements and a plurality of optical fibers. The alignment substrate has a plurality of guide holes arranged two-dimensionally and extending through the substrate. The ferrules are inserted into the respective guide holes in the same direction and have through holes in the central portions. The optical fibers are fitted and held in the respective through holes. The guide hole is formed into a cylindrical shape, the diameter of which corresponds substantially to the outer diameter of the ferrule. The light incident/exit end face of the optical fiber is exposed on one end face of the ferrule.

The disadvantage of the two previously described publications is their mechanically form-fitting and/or force-fitting hold of the individual glass fibers, which hold can be considered to be less stable, defined and/or long-lasting compared with the previously described integral welding or splicing. The mechanical forces of these connections can also generate mechanical stresses within the held glass fibers, which stresses can influence the optical transmission behavior of the glass fibers. This can take place in particular in an undefined manner and have a disruptive effect on the signal light transmission.

Another disadvantage here is that with this approach, the free ends of the glass fibers, which ends form the interface between the material of the glass fiber, such as glass, and the environment, such as air, can be easily damaged or destroyed when transmitting medium and high optical powers of a few watts to a few kilowatts.

US 2012/045169 A1 describes a method and a device for forming an optical-fiber array assembly, the method comprising: providing a plurality of optical fibers including a first optical fiber and a second optical fiber; providing a fiber-array plate, which comprises a first surface and a second surface; connecting the plurality of optical fibers to the first surface of the fiber-array plate; transmitting a plurality of optical signals through the plurality of optical fibers and into the fiber-array plate at the first surface of the fiber-array plate; and emitting, from the second surface of the fiber-array plate, a composite output beam with light from the plurality of optical signals. In some embodiments, the plurality of optical fibers are butt welded to the first surface of the fiber-array plate.

A disadvantage of connecting the open end of at least one glass fiber to an optical element of fiber exit optics is that, both when gluing using an additional adhesive and when fusing or welding the materials of the glass fiber and the optical element, material can enter between the open end of the glass fiber and the incident face of the optical element. This can lead to interference in the coupling or transmission of the signal light ray from the core of the glass fiber into the optical element at its incident face.

If, in order to avoid these disadvantages, the open end is placed so as to butt onto the incident face of the optical element and integrally connected at the edge by gluing using an additional adhesive or by fusing or welding the materials of the glass fiber and the optical element to one another, only a comparatively mechanically weak connection can be achieved between the open end of the glass fiber and the optical element at its incident face.

The alignment of the open end of the glass fiber with respect to the incident face of the optical element can also change in the event of uneven bonding or welding against the butted, i.e., perpendicular, placement, having a corresponding effect on the propagation of the signal light of the glass fiber through the optical element and even leading to the uselessness of the manufactured component.

A further disadvantage is that the incident face and other faces of the optical element except for its exit face can be optically roughened. This can serve to extract stray light radiation in the optical element, for example from the cladding of the glass fibers, or reflected signal light radiation from the exit face of the optical element, from the optical element or to reflect it diffusely. The reduction of such stray light radiation can be absolutely necessary, in particular in the case of higher optical powers, in order to implement the relevant application or to reduce the susceptibility of the laser system to interference. If the open end of the glass fiber is placed on such an optically roughened incident face and, at said face, is integrally connected at the edge, the transition of the signal light ray from the core of the glass fiber into the optical element can also be impaired by the roughened surface. The impairments can, for example, have a significant effect on the signal transmission at the connection point, the beam quality or the polarization of the signal light ray. In the case of medium and high optical powers, the entire optical element in the form of a fiber arrangement (fiber array plate) and the connected laser systems can even be destroyed. If the roughened incident face is therefore dispensed with, the advantages of a roughened surface cannot be made use of, at least for the incident face of the optical element.

It is an object of the present invention to provide a fiber exit element of the type described at the outset which can make use of the advantages of glass fiber technology and at the same time overcome or at least reduce the disadvantages described above. In particular, an arrangement of a plurality of glass fibers that is spatially as compact as possible in the region of the fiber exit element is intended to be made possible. Additionally or alternatively, the highest possible mechanical stability of the connection between the glass fiber or glass fibers and the optical element of the fiber exit element is intended to be achieved. Additionally or alternatively, a transition that is as undisturbed as possible of the signal light from the glass fiber into the optical element of the fiber exit element is intended to be achieved. Additionally or alternatively, the design options for a plurality of glass fibers in the region of the fiber exit element are intended to be increased. An alternative to known fiber exit elements is at least intended to be provided.

According to the invention, the object is achieved by a fiber exit element having the features of claim 1, by a method having the features of claim 18 and by a processing device having the features of claim 19. Advantageous further developments are described in the dependent claims.

The present invention thus relates to a fiber exit element comprising a plurality of glass fibers each having at least one core which is designed to guide a signal light ray, which can in particular be a laser ray. The fiber exit element can also be referred to as a signal light ray output, as fiber exit optics or as a fiber array. The fiber exit element also has at least one optical element, preferably an optical window, an optical lens, an optical beam splitter or an optical prism, which is connected to an open end of the cores of the glass fibers and is designed to receive the signal light ray from the open ends of the cores of the glass fibers and to output said signal light ray to the outside via at least one exit face as exit rays. In other words, each of the glass fibers has at least two ends, one end of which, as described above, is connected to the same optical element, together with the corresponding ends of the remaining glass fibers.

The fiber exit element is characterized in that the open ends of the cores of the glass fibers, preferably also the open ends of the claddings of the glass fibers substantially enclosing the cores, are each arranged within the material of the optical element with a depth of penetration, preferably with respect to an incident face of the optical element, at least the material of the open ends of the cores of the glass fibers, preferably also the material of the open ends of the claddings of the glass fibers, being fused to the material of the optical element.

In other words, the open ends of at least the cores of the glass fibers and preferably also their claddings are arranged within the material of the optical element and, there, are integrally connected to the material of the optical element by fusing the materials together, and held. As a result, when the signal light ray passes from the relevant core of the glass fiber into the optical element, the optical properties of the signal light ray can be retained. In this way, the mechanical stability of the connection of the open ends of the glass fibers or their cores or their claddings with respect to the optical element can also be improved. In addition to guiding the signal light ray, the optical element, due to its shape and/or its material properties, is also used for shaping the exit rays or the exit beam combined therefrom.

To produce such an integral connection, the material of the optical element can be melted at least in this region by heating, so that the open ends of the glass fibers are immersed in the melted material of the optical element and the melted material of the optical element can then cool down or solidify again.

The depth of penetration of the glass fibers into the material of the optical element can be selected depending on the application such that the properties and advantages described above can be achieved according to the materials and shapes of the glass fibers and the optical element. The depth of penetration of the glass fibers into the material of the optical element can preferably be understood relative to an incident face of the optical element, the incident face of the optical element being the outer face of the optical element via which the glass fibers reach the optical element and penetrate its material. By means of the depth of penetration, the exit rays, which can also be considered as a combined exit beam, can be influenced in their optical properties. The depth of penetration is dimensioned such that the open end is arranged within the material of the optical element and is laterally enclosed perpendicularly to the longitudinal extent direction of the glass fibers. The depth of penetration is preferably at least as great as the diameter of the core, preferably of the cladding, of the open end of the glass fibers and/or is deeper than the maximum structural depth of an optically rough or optically roughened surface.

According to one aspect of the invention, the optical element is connected, in the region of an incident face, to at least some, preferably to all, of the open ends of the cores of the glass fibers, preferably also to the open ends of the claddings of the glass fibers substantially enclosing the cores, the optical element being designed to widen at least in portions, preferably completely, preferably in a stepped manner or continuously, from the incident face to the exit face. In other words, the incident face of the optical element is smaller than its exit face or the cross section of the optical element increases from the incident face to the exit face. The transition from the incident face to the exit face can be continuously straight or even stepped, for example in the form of rectangular steps but also in the form of a wave shape.

It is advantageous here that stray rays within the optical element come into contact more frequently with the side face or lateral face or with the side faces or lateral faces of the optical element, as a result of which the extraction of the stray rays from the optical element can be improved. In addition, the incident face of the optical element can be reduced in size and thereby matched to the area of the previously melting glass fibers, as a result of which the volume of the optical element which is to be heated for fusing can be reduced. This can simplify or accelerate the fusing process, and/or reduce the energy required therefor.

In this way, material for forming the optical element can also be saved and/or the required installation space for the optical element can be minimized. This also makes it possible to provide options for influencing the propagation of the signal rays within the optical element as well as the exit rays.

According to a further aspect of the invention, the incident face and the exit face of the optical element are aligned in parallel with or at an angle to one another. In this way, the propagation of the signal rays within the optical element as well as the exit rays can be influenced. A parallel alignment of the incident face and the exit face of the optical element can simplify the production of the optical element and thereby reduce its costs. By aligning the exit face at an angle with respect to the incident face of the optical element, back reflections of the signal light ray from the optical element back into the glass fibers can be reduced. The exit rays on the exit face of the optical element can also be deflected in a targeted manner as a result and the length of the relevant beam path can be influenced.

According to a further aspect of the invention, at least the incident face of the optical element, preferably all outer faces of the optical element except for the exit face of the optical element, are optically roughened and at least the exit face of the optical element, preferably precisely the exit face of the optical element, is designed to have an optically smooth surface finish. An optically roughened surface can be produced, for example, by means of processing using a mechanical tool, such as by grinding, but also by means of a laser beam as a tool. An optically smooth surface can also be produced by means of processing using a mechanical tool, such as by polishing, but also by means of a laser beam as a tool. There is an optically smooth surface finish if the necessary optical properties can largely be retained for the relevant application at the corresponding wavelength or the corresponding wavelength range of the signal light ray when exiting the exit face, or if a corresponding optical coating can be applied professionally. The scratch-dig specification of the MIL-PRF-13830B standard is often used, inter alia, to evaluate the surface finish.

An optically roughened surface of the optical element can be advantageous for its outer faces, apart from the exit face, in order to allow stray rays to exit the optical element and thereby reduce the volume of the optical element. Such stray light can be cladding light from the cladding of the glass fibers. The signal rays can also be reflected on the side faces of the optical element. In addition, signal light radiation can be partially reflected in the optical element on the exit face in the form of stray light. Furthermore, signal light radiation can enter the optical element again by reflection from the outside, for example from the processing or application location of the signal light ray. As already mentioned, an optically roughened surface can be advantageous in order to reduce the mentioned stray light rays in the optical element and thus to ensure a safe operating state.

According to a further aspect of the invention, the optical element, preferably an incident face of the optical element, has at least one recess having a depth, with at least some, preferably all, of the open ends of the cores of the glass fibers, preferably also the material of the claddings substantially enclosing cores of the glass fibers, being arranged within the material of the optical element with the depth of penetration with respect to the recess.

In other words, the open ends of the glass fibers can be introduced deeper into the material of the optical element in this way without increasing the depth of penetration. Instead, the recess in the incident face of the optical element is made, for example by means of a preceding laser processing or milling process, at such a depth that the open ends of the glass fibers can be introduced, for example by means of melting, into the material of the optical element additionally by the depth of penetration. The total distance from the open ends of the glass fibers to the incident face of the optical element can thus be calculated by adding the depth of the recess and the depth of penetration and can be easily increased accordingly.

According to a further aspect of the invention, at least one exit face of the optical element has, at least in portions, preferably over the entire surface, an optical coating, preferably an optical anti-reflective coating. In this way, the transition of radiation through the exit face out of the optical element and/or from the side of the exit face into the optical element can be influenced. In particular, the penetration of stray radiation from outside the optical element can be prevented or at least reduced by an optical anti-reflective coating. Such a coating can be selected accordingly in order to reflect the relevant wavelengths or wavelength ranges. This can reduce the amount of stray radiation within the optical element.

According to a further aspect of the invention, at least one, preferably some, particularly preferably all, of the glass fibers have at least one cladding substantially enclosing the core, with at least one pump light trap, preferably in the form of recesses, being formed in the material of the cladding of the glass fiber in the region of the fiber exit element in order to guide cladding light away from the cladding of the glass fiber to outside the glass fiber. Such a pump light trap can also be referred to as a cladding light remover or a cladding light stripper. In this way, stray cladding light can be removed from the claddings of the glass fibers directly in front of the optical element and/or reflected cladding light from the optical element can be reduced. This can reduce the entry of stray rays into the optical element.

According to a further aspect of the invention, the fiber exit element has at least one stress element in the region of the fiber exit element, which stress element is designed to exert mechanical stress, preferably in the form of tensile forces, compressive forces, bending forces and/or shear forces, on at least the core of one, preferably some, particularly preferably all, of the glass fibers, preferably and on a cladding of the glass fiber substantially enclosing the core, over a predetermined portion of the longitudinal extent of the glass fibers. In this way, the transmission of the signal light ray within the core of the relevant glass fiber can be influenced in a targeted manner. The region of the fiber exit element comprises at least the region, for example, inside a housing of the fiber exit element and also a region outside the housing of the fiber exit element directly adjoining this.

According to a further aspect of the invention, the open end of the core of at least one, preferably some, particularly preferably all, of the glass fibers is arranged at least at a first angle with respect to an incident face of the optical element, the first angle being 90° or different from 90°, the open ends of the cores of some, preferably all, of the glass fibers preferably having the same first angle or different first angles. In any case, the directions of propagation of the signal rays within the optical element can be influenced by the orientation of the open ends of the glass fibers with respect to the incident face of the optical element. A perpendicular arrangement of the glass fibers with respect to the incident face can simplify production. By aligning the glass fibers at an angle with respect to the incident face, the propagation of the signal light ray can be configured accordingly. In particular, the optical path through which the signal rays pass within the optical element can be increased without having to enlarge the optical element for this purpose.

According to a further aspect of the invention, the open end of the core of at least one, preferably some, particularly preferably all, of the glass fibers is also arranged at a second angle with respect to an incident face of the optical element, the second angle being 90° or different from 90°, the open ends of the cores of some, preferably all, of the glass fibers preferably having the same second angle or different second angles and/or the first angle and the second angle preferably being the same or different. The two angles are preferably oriented perpendicularly to one another. This can further increase the number of design options.

According to a further aspect of the invention, at least some, preferably all, of the open ends of the cores of the glass fibers, preferably also the open ends of the claddings of the glass fibers substantially enclosing the cores, are each arranged within the material of the optical element with the same depth of penetration or with a different depth of penetration. Using the same depth of penetration can simplify production. By varying the depth of penetration between individual glass fibers, the exit rays or an exit beam combined therefrom can be influenced in its/their optical properties. In other words, the signal light rays of the individual glass fibers, due to their different depths of penetration into the optical element, can pass through optical paths of different lengths and thus have different optical properties, such as different beam diameters, at the exit face of the optical element.

According to a further aspect of the invention, at least one, preferably some, particularly preferably all, of the glass fibers can be aligned about the axis of its longitudinal extent and is arranged in a preferred alignment. In other words, at least one of the glass fibers is not designed to be rotationally symmetrical but has the option, for example due to its cross section, for example in the form of an angular cross section, of being aligned differently with respect to the optical element by rotation or by alignment about the axis of its longitudinal extent. This can additionally or alternatively also be the case for polarization-maintaining glass fibers and/or for glass fibers having stress cores. By means of the alignment, particular optical properties of the signal output radiation can be achieved, which can increase the design options for the exit rays.

According to a further aspect of the invention, at least some, preferably all, of the open ends of the cores of the glass fibers are arranged in a linear, V-shaped, circular, semicircular, arcuate, bundle-like, hollow-cylindrical or rectangular manner with respect to one another. This can increase the design options for the exit rays.

According to a further aspect of the invention, at least the open end of the core of one of the glass fibers is arranged so as to form a center of a circle, at least some, preferably all, of the open ends of the cores of the glass fibers being arranged in a circle around the center of the circle, preferably at least one radially inner circle and one radially outer circle being formed, and/or preferably all of the open ends of the cores of the glass fibers, preferably all of the claddings of the glass fibers substantially enclosing the cores, being arranged equally or differently spaced apart or in contact with one another. In this way, a correspondingly shaped combined beam of the output rays can be achieved. The glass fiber types, shapes and diameters can vary within the fiber exit element.

According to a further aspect of the invention, at least some, preferably all, of the open ends of the cores of the glass fibers, preferably all of the claddings of the glass fibers substantially enclosing the cores, are arranged equally or differently spaced apart or in contact with one another. This can increase the design options for the exit rays.

According to a further aspect of the invention, at least some, preferably all, of the cores of the glass fibers, preferably and/or some, preferably all, of the claddings substantially enclosing the cores of the glass fibers, have, at least in the region of the fiber exit element, a constant or different diameter and/or a constant or different cross section in their longitudinal extent direction. This can increase the design options for the output rays.

The diameter of the glass fibers or their claddings can be reduced in a targeted manner by etching before the welding process, so that, for example, the cores of the glass fibers can be brought closer to one another in the optical element. The diameter of the individual glass fibers can also be reduced by tapering, which can also lead to the geometric advantages described above. In addition, when tapering, the mode field diameter of the signal can be modified before the welding process in order to achieve the desired properties of the combined exit beam.

According to a further aspect of the invention, at least some, preferably all, of the cores of the glass fibers, preferably and/or some, preferably all, of the claddings substantially enclosing the cores of the glass fibers, have the same or different materials and/or the same or different diameters and/or the same or different cross sections, preferably circular, rectangular, square or octagonal. This preferably also includes the fact that single-mode glass fibers, large-mode-area glass fibers, multi-mode glass fibers, polarization-maintaining glass fibers, photonic crystal glass fibers and multi-core glass fibers can be used. This can increase the design options for the output rays.

The present invention also relates to a method for producing a fiber exit element, preferably as described above, comprising at least the following steps:
  providing a plurality of glass fibers each having at least one core which is designed to guide a signal light ray;
  providing at least one optical element, preferably an optical window, an optical lens, an optical beam splitter or an optical prism, which is designed to receive the signal light ray from the open ends of the cores of the glass fibers and to output said signal light ray to the outside via at least one exit face as exit rays;
  aligning at least one first processing beam with at least one processing zone of the optical element;
  heating at least the processing zone of the optical element by means of at least the first processing beam such that the material of the optical element has, at least in the processing zone, sufficient flowability to receive therein the open ends of the cores of the glass fibers, preferably also the open ends of the claddings of the glass fibers substantially enclosing the cores; and
  moving at least the glass fibers and/or the optical element toward each other such that the open ends of the cores of the glass fibers, preferably also the open ends of the claddings of the glass fibers, penetrate the material of the optical element in the processing zone of the optical element with a depth of penetration, and at least the material of the open ends of the cores of the glass fibers, preferably also the material of the open ends of the claddings of the glass fibers, is fused to the material of the optical element.

In this way, a corresponding fiber exit element, preferably as described above, can be produced in order to implement the corresponding, and preferably the above-described, properties and advantages.

According to one aspect of the invention, the method comprises at least the further step of:
  introducing at least one recess into the optical element, preferably into an incident face of the optical element, with a depth,
the processing zone of the optical element comprising the recess of the optical element, the recess of the optical element preferably being arranged at least substantially in the middle of the processing zone of the optical element.

According to a further aspect of the invention, at least one, preferably some, particularly preferably all, of the glass fibers has at least one cladding substantially enclosing the core, the method having at least the further step of:
  introducing at least one pump light trap, preferably in the form of recesses, into the material of the cladding of the glass fiber in the region of the fiber exit element, which trap is designed to guide cladding light away from the cladding of the glass fiber to outside the glass fiber.

According to a further aspect of the present invention, the method has at least the further step of:

arranging at least one stress element in the region of the fiber exit element, which stress element is designed to exert mechanical stress, preferably in the form of tensile forces, compressive forces, bending forces and/or shear forces, on at least the core of one, preferably some, particularly preferably all of the glass fibers, preferably and on at least one cladding of the glass fiber substantially enclosing the core, over a predetermined portion of the longitudinal extent of the glass fiber.

According to a further aspect of the present invention, the method has at least the further step of:

aligning the open end of the core of at least one, preferably some, particularly preferably all, of the glass fibers at least at a first angle, preferably also at a second angle, with respect to an incident face of the optical element, the first angle, preferably and/or the second angle, being 90° or different from 90°, the open ends of the cores of some, preferably all, of the glass fibers preferably having the same first angle, preferably and/or the same second angle, or different first angles, preferably and/or different second angles, the first angle and the second angle preferably being the same or different.

According to a further aspect of the present invention, the method has at least the further step of:

aligning at least one, preferably some, particularly preferably all, of the glass fibers about the axis of its longitudinal extent.

The present invention also relates to a processing device for producing a fiber exit element, preferably as described above, preferably by means of a method as described above, comprising: at least one receiving unit for receiving a plurality of glass fibers, each comprising at least one core which is designed to guide a signal light ray; at least one receiving unit for receiving at least one optical element which is designed to receive the signal light ray from the open ends of the cores of the glass fibers and to output said signal light ray to the outside via an exit face as an exit ray; and at least one first processing beam source, preferably a first laser beam source, particularly preferably a first $CO_2$ laser beam source, which is designed to generate a first processing beam and, directly or indirectly by means of a first movable alignment element, preferably by means of a first pivotable mirror, to direct said beam at a processing zone of the optical element, to move said beam in the processing zone, and to heat the processing zone of the optical element in such a way that the material of the optical element has, at least in the processing zone, sufficient flowability to receive therein the open ends of the cores of the glass fibers, preferably also the open ends of claddings of the glass fibers substantially enclosing the cores, the receiving unit for receiving at least the glass fibers and/or the receiving unit for receiving at least the optical element being movable toward one another, each in a relevant direction of movement, in such a way that at least the glass fibers and/or the optical element can be moved toward one another such that the open ends of the cores of the glass fibers, preferably also the open ends of the claddings of the glass fibers penetrate the material of the optical element in the processing zone of the optical element with a depth of penetration, and at least the material of the open ends of the cores of the glass fibers, preferably also the material of the open ends of the claddings of the glass fibers, can be fused to the material of the optical element.

In this way, a processing device can be created in order to be able to produce fiber exit elements, preferably as described above, with the highest possible degree of mechanical assistance or automation. This can increase the quality of the products produced and/or reduce their costs.

Heating or melting the processing zone of the optical element by means of the first processing beam at least predominantly and preferably exclusively, and accordingly hardly or not at all heating the glass fibers or their open ends by means of the first processing beam, can be advantageous in that the comparatively delicate glass fibers can be protected and kept as unchanged as possible in the optical element.

According to one aspect of the invention, the processing device has at least one second processing beam source, preferably a second laser beam source, particularly preferably a second $CO_2$ laser beam source, which is designed to generate a second processing beam and, directly or indirectly by means of a second movable alignment element, preferably by means of a second pivotable mirror, to direct said beam at a processing zone of the optical element and to move said beam in the processing zone such that the heating of the processing zone of the optical element can be carried out jointly by the first processing beam and by the second processing beam. This can increase the design options for heating the processing zone.

According to a further aspect of the invention, the first processing beam source, preferably and the second processing beam source, is designed, directly or indirectly by means of the first movable alignment element, preferably and by means of the second movable alignment element, to direct the first processing beam, preferably and the second processing beam, onto the material of the cladding of the glass fiber in the region of the fiber exit element, such that at least one pump light trap, preferably in the form of recesses, can be formed in the material of the cladding of the glass fiber in order to guide cladding light away from the cladding of the glass fiber to outside the glass fiber. In this way, the formation of a pump light trap can also be implemented by means of the processing device according to the invention, and this can minimize the production complexity of the fiber exit element together with the pump light trap. By means of the pump light trap in the region of the fiber exit element, in particular in addition to at least one pump light trap in the preceding course of the glass fibers outside the region of the fiber exit element, cladding light or remaining cladding light can be removed from the cladding directly in front of the fiber exit element and thus the penetration of cladding light into the fiber exit element can be avoided, which can otherwise lead to the development of stray light signals within the fiber exit element. Reflected cladding light coming from the optical element can also be reduced.

According to a further aspect of the invention, the receiving unit for receiving at least the glass fibers and/or the receiving unit for receiving at least the optical element is/are arranged and/or pivotably movable such that the open ends of the cores of the glass fibers can be aligned at least at a first angle, preferably also at a second angle, with respect to an incident face of the optical element, the first angle, preferably and/or the second angle, being 90° or different from 90°, the first angle and the second angle preferably being the same or different. In this way, a corresponding alignment can also be carried out by the processing device.

According to a further aspect of the invention, the processing device has at least one first image capturing unit, preferably a first array camera, which is designed to optically capture, at least in the region of the processing zone, the optical element received in the receiving unit, from the side of the receiving unit for receiving at least the glass fibers or from the side facing away from the receiving unit for receiving at least the glass fibers, the processing device also preferably having a second image capturing unit, preferably a second array camera, which is designed to optically detect the optical element received in the capturing unit, from the side opposite the first image capturing unit, at least in the region of the processing zone. This can, for example, allow a person to at least check the arrangement or alignment of the glass fibers with respect to the optical element.

According to a further aspect of the invention, the receiving unit for receiving at least the glass fibers can be moved perpendicularly and/or rotationally with respect to its direction of movement and/or the receiving unit for receiving at least the optical element can be moved perpendicularly and/or rotationally with respect to its direction of movement, such that the open ends of the cores of the glass fibers and the processing zone of the optical element can be aligned with one another. In this way, a corresponding alignment can also be carried out by the processing device.

According to a further aspect of the invention, the processing device, preferably a control unit of the processing device, is designed to automatically align the open ends of the cores of the glass fibers and the processing zone of the optical element with one another according to at least one captured optical image from the first image capturing unit, preferably also from the second image capturing unit. This can allow the corresponding process to be automated.

According to a further aspect of the invention, the processing device has at least one alignment unit, preferably a translationally and rotationally movable gripper, which is designed to align, with respect to the optical element, at least one, preferably some, particularly preferably all, of the glass fibers together or independently of one another about the axis of its/their longitudinal extent. In other words, the processing device is able, by means of at least one alignment unit, to grip at least one glass fiber, for example in the region of its coating, and to rotate said fiber about its longitudinal axis, such that a predetermined alignment of the glass fiber can take place. In particular, for this purpose, the alignment unit can reach individual or a plurality of glass fibers one after the other and align them in this way. For this purpose, the alignment unit can be moved and positioned translationally in a spatial direction and preferably in a plane perpendicular to the longitudinal extent direction of the glass fiber. This can be implemented, for example, by means of a corresponding gripper.

As a result, glass fibers that are not rotationally symmetrical can be aligned differently with respect to the optical element by rotating or by aligning said fibers about the axis of their longitudinal extent, and this, for example in polarization-maintaining glass fibers and/or in glass fibers having stress cores, can allow the optical properties of the signal output radiation to be influenced, as described above.

According to a further aspect of the invention, the processing device has at least one temperature detection unit, preferably an infrared array camera, which is designed to detect a temperature of the optical element received in the receiving unit, from the side of the receiving unit for receiving at least the glass fibers, at least in the region of the processing zone. This can at least make it possible to monitor the process of heating the processing zone.

According to a further aspect of the invention, the processing device, preferably a control unit of the processing device, is designed to control, in an open-loop and/or closed-loop manner, the generation, preferably at least the power, and/or the positioning of at least the first processing beam, preferably also of the second processing beam, according to the temperature detected by the temperature detection unit. As a result, the heating or melting of the processing zone can take place such that the temperature is controlled in an open-loop and/or closed-loop manner. This can avoid unnecessary heating of the processing zone. In addition, this ensures sufficient heating of the processing zone before the open ends of the glass fibers are moved into the processing zone. This can improve the quality of the fiber exit elements produced and/or reduce the waste of defective fiber exit elements.

According to a further aspect of the invention, the processing device has at least one cooling unit which is designed to cool the optical element received in the receiving unit at least largely outside the region of the processing zone, the cooling unit preferably having an air blower which is designed to direct an air flow onto the side of the optical element facing away from the receiving unit for receiving at least the glass fibers. In this way, the heating of the optical element outside the processing zone can be reduced.

In other words, optical glass fibers are typically used today to generate laser radiation or to deliver laser radiation (beam delivery) from the laser to the place of use. This can be, for example, single- or multi-mode glass fibers, polarization-maintaining glass fibers (PM) or photonic crystal glass fibers as well as hollow core glass fibers, to name just a few examples of glass fiber types available on the market. The optical components according to the invention and methods for producing these components therefore relate to the full range of glass fiber types available on the market. Even if the main area of application relates to glass fibers, polymer fibers or fibers made of other materials, for example so-called soft glass fibers for the middle IR range, can also be used for this/these application(s).

For many applications, for example in material processing or in medical technology, however, it is appropriate to use a plurality of laser beams in an arrangement that is as spatially compact as possible and, above all, thermally and mechanically highly stable at the place of use. This could be achieved, for example, in free-beam optics with any arrangement of microlenses, but this would mean losing the considerable advantages of glass fiber technology.

In order to overcome this problem, according to the invention, a plurality of glass fibers can be welded (spliced; fusion splicing) to an optical element in any arrangement. (see, for example, FIG. 1). By welding (splicing), a monolithic optical component is produced which is suitable in particular for medium and high optical powers and at the same time, in a compact form, allows glass-fiber-based shaping (usually spatial) of energy radiation, preferably laser radiation, in a harsh industrial environment or in a field having high safety requirements, such as in medical technology, or in a field of application having extremely high temperature requirements. In addition to the typical welding, other connection techniques could also be used.

When connecting the glass fibers to the optical element, the depth of penetration of the optical glass fibers into the optical element can be adjusted depending on the application. It is also possible for the glass fibers, when connecting to the optical element (z-direction in FIG. 1), to penetrate the optical element at different depths, or for individual or all glass fibers to be inserted especially deeply into the optical element by means of holes or other aids. In addition, individual glass fibers or all glass fibers can be connected to the optical element at a particular angle α (see, for example, FIG. 1). This also applies to the angle (not shown in FIG. 1) in the z-y plane.

An example structure of such an optical component for combining and shaping energy radiation, preferably laser radiation, is shown in FIG. 1. Laser beam sources or other beam sources (coherent or incoherent, optionally polarization-maintaining, possibly pulsed) can be connected to the glass fibers 1 to n. In this way, the electromagnetic radiation from a plurality of laser beam sources or other beam sources can be delivered to the place of use.

The beam sources or the power components in the optical glass fibers can be operated simultaneously, so as to be offset in time, or with a time modulation of the individual power components in the optical glass fibers that is reasonable for the process. The beam sources can be identical in design or differ, for example, in terms of polarization, wavelength or optical pulse length. In addition, it is possible to transmit the power or individual spectral power components of a beam source or, optionally, a laser beam source to the glass fibers 1 to n in any splitting ratio. The laser or any other light source can work continuously or in a pulsed manner. The glass fibers 1 to n can also be used for the coherent or incoherent combination of laser beam sources. Depending on the application, there are numerous possible variations based on the available properties of the laser systems or other available light sources.

The optical element (see, for example, FIG. 1) can be, for example, an optical window with or without an optical coating or a lens and an optical beam splitter, to name just a few examples of optical elements. The optical element can also consist of a plurality of individual optical elements, for example an array of microlenses or a flexible material (for example polymer) having suitable optical properties for the relevant application. The optical element can also consist of different materials or vary in its material properties over its dimensions (x, y and z directions, see, for example, FIG. 1), for example by partially doping the optical element. If the optical element consists of different materials, these can be glued, welded or bonded.

The optical element fulfills the following important properties in particular, at least partially or completely:
1. stable fixation of the glass fiber(s) in a particular geometric arrangement (usually without the use of additional aids such as adhesives);
2. modification of the optical properties, for example beam shape, individual or all beam sources 1 to n before reaching the place of use;
3. spatial expansion of the optical beam during propagation through the optical element to reduce the optical intensity at the glass/air interface;
4. mechanically and/or optically stable receptacle for the glass fiber(s);
5. high thermal stability, since usually no adhesives or other auxiliary materials have to be used;
6. high optical performance stability;
7. any shaping of energy radiation at the place of use in a very small space;
8. low absorption of optical radiation in the volume of the element;
9. low reflections at the interfaces of the optical element, for example due to an anti-reflective coating;
10. implementation of a glass-fiber-based solution;
11. combination of (spatial) beam shaping on a scale from a few 10 µm to a few millimeters and guidance of medium and high optical powers; and
12. compared with the small glass fibers (a few 100 µm), the optical element can have a significantly larger size and almost any design and can thus be appropriately effectively held in mechanical mounts.

The arrangement of the glass fibers at/on the optical element can be carried out in any way, depending on what the specific application requires. Some embodiments relating to arrangements of the glass fiber(s) at or on the optical element are shown in FIGS. 2 to 6. FIGS. 2 to 6 show, by way of example, that the targeted arrangement of the glass fibers at or on the optical element results in one- or two-dimensional fiber arrays. The third dimension can be used by varying the depth of the glass fibers (z-direction). The glass fibers can be in direct glass-to-glass contact (without spacing) or have a defined spacing. The spacing between the glass fibers at or on the optical element can vary from glass fiber to glass fiber—in both dimensions (x-direction and y-direction; see, for example, FIG. 1).

In addition, the diameter of the individual glass fibers can be reduced, optionally by etching the glass fibers, and thus the spacing between the glass fibers can be reduced. Furthermore, the glass fibers or individual glass fibers can be tapered in diameter before the process of welding at/onto the optical element. In addition, the glass fibers or individual glass fibers can even be laterally welded at/onto the optical element in any arrangement (for example a fiber bundle) before the welding process (fiber fusion). The production steps of tapering and welding the glass fibers as a pre-process before the actual connection of the glass fibers to the optical element can be combined as desired.

The glass fibers can have different diameters (typically approximately 80 µm to approximately 1.5 mm) and cross sections, for example round, rectangular and octagonal. Due to the spatial arrangement of the individual glass fibers 1 to n (see, for example, FIG. 1) at/on the optical element, a defined beam shape can be achieved for a particular application downstream of the optical element (at the place of use), for example a line, a circle, a semicircle, a hollow cylinder or a V-shape.

Due to the temporal variation of the optical power that is guided into the respective glass fibers 1 to n, the beam shape and other properties of the radiation source (power, intensity, energy, polarization, spectral bandwidth) can additionally be varied according to various process parameters. In this way, the radiation can be controlled in an open-loop and/or closed-loop manner at the place of use. For example, with the arrangement of the glass fibers on or at the optical element as in FIG. 5, the beam diameter of the energy beam, preferably the laser beam, can be varied at the place of use. If radiation is emitted only from the central fiber, the beam diameter at the place of use is very small. If radiation is emitted from the glass fibers of the first ring, the beam diameter increases. The maximum beam diameter is achieved when the glass fibers emit radiation from the second ring of the optical element. This can now be used as desired in the manufacturing process, for example during laser welding or laser cutting, by means of open-loop and/or closed-loop control. The temporal beam shaping or laser beam shaping could thus take place in the microsecond or millisecond range.

The optical component in FIG. 1 is characterized in particular by the fact that its design allows the compact combination and shaping of optical radiation with optical glass fibers for medium and higher optical powers (typically greater than approximately 1 W to a few 10 kW).

The optical component is further characterized in particular in that many glass fibers can be converted into a highly stable monolithic component in a very compact space in any shape or arrangement with the aid of an optical element, for example by welding the glass fibers to the optical element, which monolithic component can deliver, combine and shape optical radiation with high powers (up to a few 10 kW) in the smallest of spaces, usually approximately 100 µm to approximately 10 mm.

In addition, the optical component, as shown by way of example in FIG. 1, allows targeted radiation shaping required for the place of use and/or the open-loop or closed-loop control of other optical properties in the smallest of spaces. Due to the monolithic and thus highly stable design of the optical component together with fiber-based radiation supply, the component can, for example, provide a perfect solution for use on a robot arm for laser manufacturing. The robot arm can move at high speeds and accelerations without influencing the light guidance and beam shaping.

To produce the optical elements described above, as shown by way of example in FIG. 1, the processing device shown in FIG. 13 can be used. The processing device has at least one radiation source, for example in the form of a laser beam source, which can emit a directed energy beam in the form of a laser beam. The laser beam can optionally be focused or defocused by a lens (not shown) and deflected about two axes by a pivotable deflection element in the form of a pivotable mirror (see FIG. 13). The energy beam or the energy beams can impinge on the optical element at any desired, technically meaningful angle, depending on the application. The diameter of the laser beam can vary on the optical element depending on the application and is usually a diameter (Gaussian beam 1/e2) of approximately 100 µm to a few millimeters. In some applications, the laser beam diameter can be made significantly larger.

The energy radiation is partially or completely absorbed by the glass fibers and/or by the optical element. This results in the heating necessary for the welding process. The temporal open-loop and/or closed-loop control of the energy beam and/or the deflection element makes it possible for the weld zone to be shaped spatially and temporally and in a targeted manner for the welding (splicing) of individual glass fibers or any fiber arrangements as shown by way of example in FIGS. 2 to 6. The weld zone can thus be made to be, round, angular, V-shaped or annular, for example. The weld zone can thus be adapted to the glass fiber arrangements shown in FIGS. 2 to 6 for the welding process. The deflection element can optionally be controlled electrically or electromagnetically (for example via a galvanometer scanner).

In order to be able to control the welding process very precisely, the thermal radiation emitted from the weld zone can be detected using a sensor and used to control the laser power and the deflection unit or other process variables in a closed-loop and/or open-loop manner. This allows the process temperatures to be detected using a pyrometer or a thermal imaging camera, for example. When the weld zone is formed, the optical element can additionally be moved translationally and rotationally.

After the weld zone has been formed on the optical element, the glass fibers are immersed individually, in particular packages or all together in the optical element in the direction of movement (see FIG. 13). The glass fibers can be in direct lateral contact or have a certain spacing from one another. The spacing from glass fiber to glass fiber can also vary. In addition, individual glass fibers or all of the glass fibers can be welded to the optical element at a particular angle. During the immersion process, the energy beam or laser beam is usually switched off. The depth of immersion of the glass fibers in the optical element is usually a few µm to a few 10 µm, but can also be significantly greater than 100 µm for special applications.

During the welding process, usually only the optical element is heated by energy radiation. The glass fibers are therefore not directly irradiated with energy beams. During welding, the large optical element serves as a heat store and heats the glass fibers sufficiently before they are immersed in the optical element. In order to carry out this welding process completely integrally, process temperatures, immersion speeds of the glass fibers and other process parameters must be controlled very precisely. If the temperature of the optical element during the process of immersing the glass fibers in the region of the weld zone should experience excessive cooling, the optical element can also be heated by means of energy radiation during the process of immersing the glass fibers. With the aid of the deflection element, the energy radiation is deflected onto the optical element such that the optical element can be further heated or reheated without directing the energy radiation to the glass fibers. Of course, there are also glass fiber arrangements that allow simultaneous energy irradiation of the glass fibers and of the optical element during the welding process.

Heating exclusively the optical element using energy radiation, i.e., the glass fiber is not irradiated with energy and thus heated, is also of great technological relevance when welding temperature-sensitive individual glass fibers (e.g., hollow core glass fibers, photonic crystal glass fibers). In addition, this approach can also be relevant when welding glass fibers having a low melting point (soft glass fibers) or when welding different materials. In this way, welded connections can be achieved which can hardly or cannot be produced using the energy irradiation methods previously described in the literature, that is to say using the simultaneous irradiation of the glass fiber and the optical element.

For the processing device shown in FIG. 13, the CO2 laser has proven to be particularly advantageous in practice due to good absorption of the laser radiation (approximately 10 µm wavelength) in quartz glass and the comparatively inexpensive purchase. The laser radiation used for the processing device can be optimized for the relevant application in terms of wavelength, polarization, pulse length and other optical properties. The optical element in FIG. 13 could also be produced by energy radiation, preferably laser radiation, from the side or from below (potentially from all spatial directions) from a combination of the variants described. A plurality of laser beam sources having different optical properties can also be used to heat the optical element and, optionally, the glass fibers.

The first and the second camera can be used to position the glass fibers and the optical element or the optical elements, to check the quality of the welded connection during and after the process and to control the welding process in an open-loop and/or closed-loop manner (see FIG. 13). The cameras can work in the visible wavelength range (VIS) and/or in the infrared wavelength range. FIG. 13 shows a typical but not mandatory arrangement of the camera systems. It is also possible to use more than two cameras at other positions to position the glass fibers and the optical element or the optical elements, to check the quality of the welded connection during and after the process and to control the welding process in an open-loop and/or closed-loop manner. The cameras can of course be equipped with appropriate lenses or objectives depending on the desired optical image.

Several embodiments and further advantages of the invention are illustrated purely schematically and explained in greater detail below in connection with the following drawings, in which.

The above figures are viewed in Cartesian coordinates. A longitudinal direction X extends, which may also be referred to as the depth X or the length X. A transverse direction Y, which may also be referred to as the width Y, extends perpendicularly to the longitudinal direction X. A vertical direction Z, which may also be referred to as the height Z, extends perpendicularly to both the longitudinal direction X and the transverse direction Y. The longitudinal direction X and the transverse direction Y together form the horizontal X, Y, which may also be referred to as the horizontal plane X, Y.

Figure 1:
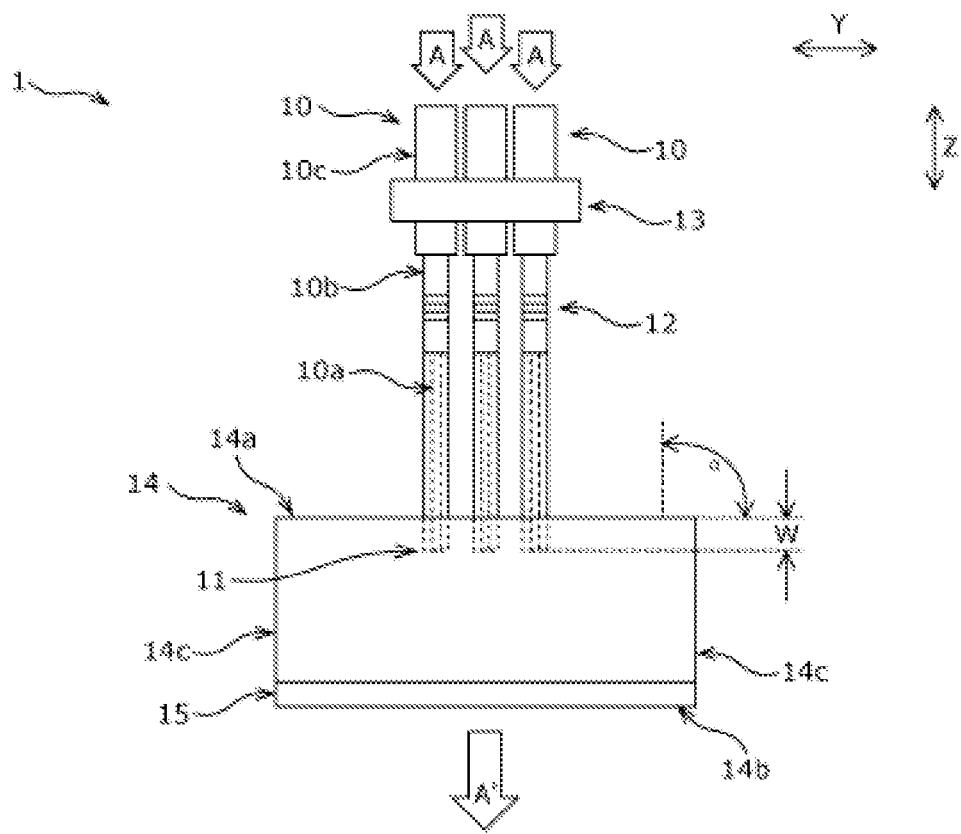
FIG. 1 is a schematic representation of a fiber exit element according to the invention from the side.

FIG. 1 is a schematic representation of a fiber exit element 1 according to the invention from the side. The fiber exit element 1 can also be referred to as a signal light ray output 1, fiber exit optics 1 or a fiber array 1.

The fiber exit element 1 has a plurality of glass fibers 10, each of which has a core 10a which is cylindrically enclosed by a cladding 10b, and the cladding 10b is cylindrically enclosed by a coating 10c. The cross sections or the contours of the cores 10a, the claddings 10b and the coatings 10c are each circular. In their longitudinal extent direction, the glass fibers 10 end in the vertical direction Z at a common, identical height, each with an open end 11. The cores 10a and the claddings 10b of the glass fibers 10 extend equally and end together at the relevant open end 11. The coatings 10c are each spaced apart from the open ends 11 of the glass fibers 10 in the vertical direction Z at the same height.

The fiber exit element 1 also has an optical element 14, which can also be referred to as an optical window 14, an optical lens 14, an optical beam splitter 14 or an optical prism 14. The optical element 14 is, for example, in the shape of a cuboid according to FIG. 1 and has an incident face 14a pointing upward in the vertical direction Z and an exit face 14b facing downward on the opposite side. The four sides of the cuboid optical element 14 are formed by the side faces 14c. On the underside of the optical element 14, an optical coating 15 in the form of an anti-reflective coating 15 is applied over the entire area, which coating can be considered part of the optical element 14, so that the exit face 14b of the optical element 14 coincides with the underside or outside of the anti-reflective coating 15.

The open ends 11 of the cores 10a and the claddings 10b of the glass fibers 10 are arranged within the material of the optical element 14 with a depth of penetration W with respect to the incident face 14a of the optical element 14. For this purpose, the materials of the cores 10a and the claddings 10b of the glass fibers 10 have been fused to the material of the optical element 14, as will be described in more detail below. In this way it can be ensured that signal light rays A, for example in the form of laser light rays A, can be introduced into the optical element 14 as completely as possible and in a manner that is as interference-free as possible. The signal light rays A introduced into the optical element 14 can pass therethrough and emerge to the outside as exit rays A' via the exit face 14b of the optical element 14. The exit rays A' can thereby also form a combined output beam. The mechanical stability of the integral connection between the glass fibers 10 and the optical element 14 can also be improved as a result.

The glass fibers 10 are aligned perpendicularly to the incident face 14a of the optical element, so that both a first angle α and a second angle β (see FIG. 10) are 90°.

The claddings 10b of the glass fibers 10 each have a pump light trap 12 in the region in which the coatings 10c have been removed, which trap can also be referred to as a cladding-light remover 12 or a stripping element 12 and is in the form of annular recesses 12. By aligning the annular recesses 12 perpendicularly to the direction of propagation of the signal light rays A or to the longitudinal extent direction of the glass fibers 10, stray cladding light can be decoupled to the outside from the claddings 10b of the glass fibers 10 immediately before reaching the optical element 14. In this way, the entry of stray rays from the cladding light into the optical element 14 can be avoided. Reflected cladding light, coming from the optical element, can also be reduced.

In the region of the coatings 10c of the glass fibers 10, a stress element 13 is arranged across all of the glass fibers. Mechanical stress, for example in the form of compressive forces, can be exerted on the glass fibers 10 or at least their cores 10a via the stress element 13. As a result, the transmission or the optical properties of the signal light rays A can be influenced in a targeted manner by adjusting the mechanical stress.

The side faces 14c and the incident face 14a of the optical element 14 are optically roughened in order to promote the emergence of stray rays from the optical element 14. The underside of the optical element 14, which is covered by the optical coating 15, is designed to be optically smooth, in order thereby to promote the exit of the exit rays A'.

Figure 2:
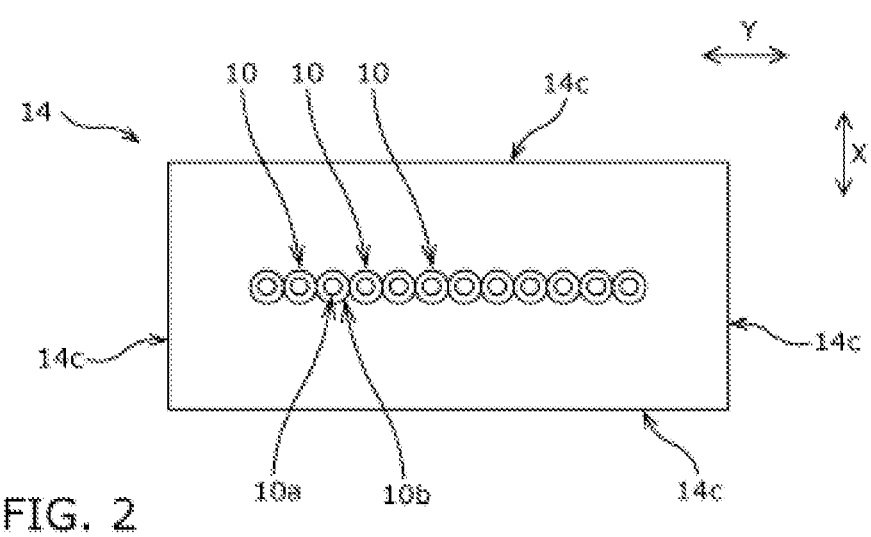
FIGS. 2 to 6 are schematic representations of different arrangements of glass fibers from above.

FIG. 2 is a schematic representation of an arrangement of glass fibers 10 from above. In this case, the cylindrical glass fibers 10 are arranged linearly in the transverse direction Y without spacing, such that the claddings 10b of the directly adjacent glass fibers 10 touch one another. The optical element 14 is rectangular or cuboid.

Figure 3:
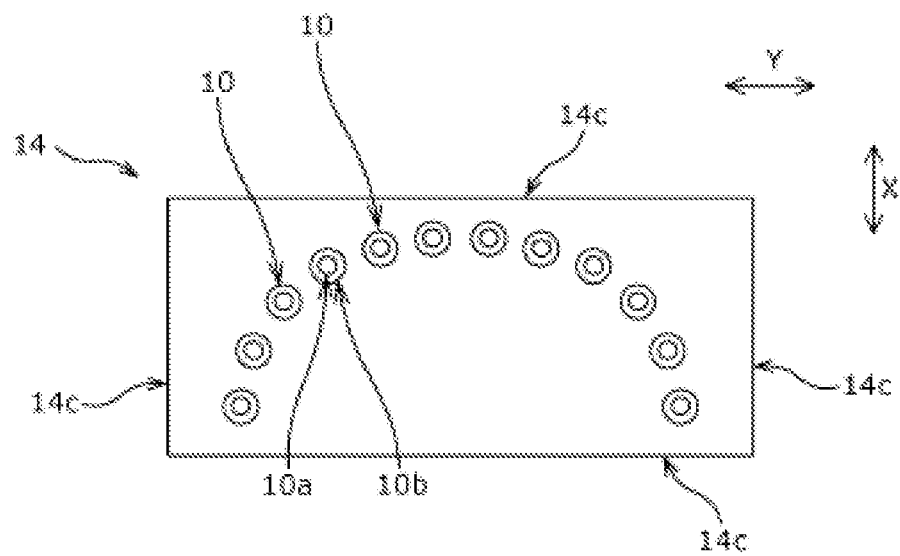

FIG. 3 is a schematic representation of an arrangement of glass fibers 10 from above. In this case too, the optical element 14 is rectangular or cuboid. The cylindrical glass fibers 10 are arranged in a semicircle and are spaced apart from one another in the circumferential direction.

Figure 4:
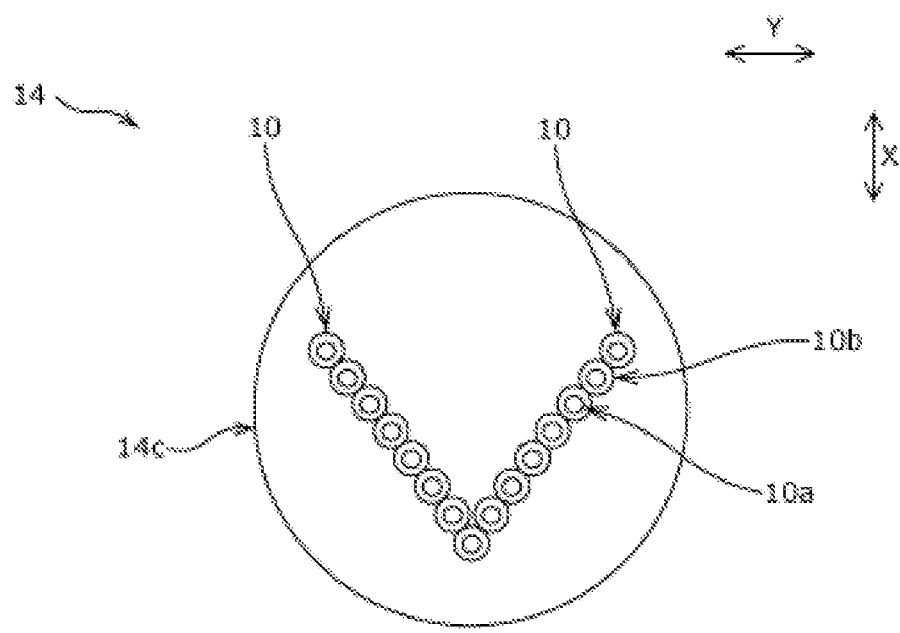

FIG. 4 is a schematic representation of an arrangement of glass fibers 10 from above. In this case, the optical element 14 is circular or cylindrical. The cylindrical glass fibers 10 are arranged in a V-shape without spacing, such that the claddings 10b of the directly adjacent glass fibers 10 touch one another.

Figure 5:
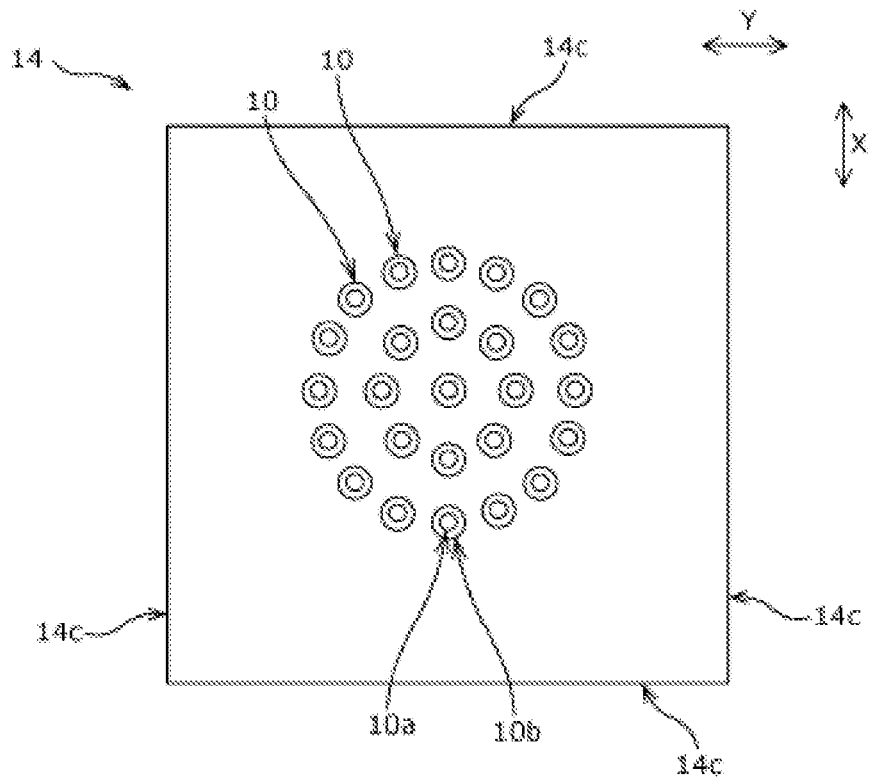

FIG. 5 is a schematic representation of an arrangement of glass fibers 10 from above. In this case, the optical element 14 is designed to be square or cuboid. A cylindrical glass fiber 10 forms the center or the axis of symmetry of a point-symmetrical circular arrangement in which a plurality of further cylindrical glass fibers 10 extend around the center in a first inner ring and in a second outer ring.

Figure 6:
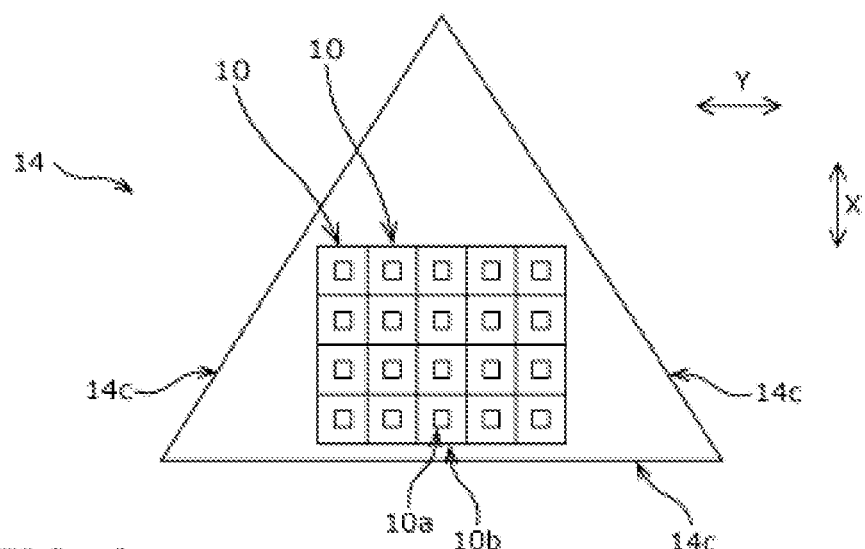

FIG. 6 is a schematic representation of an arrangement of glass fibers 10 from above. In this case, the optical element 14 is triangular. A plurality of square glass fibers 10 having square cores 10a and square claddings 10b form a rectangular arrangement.

Figure 7:
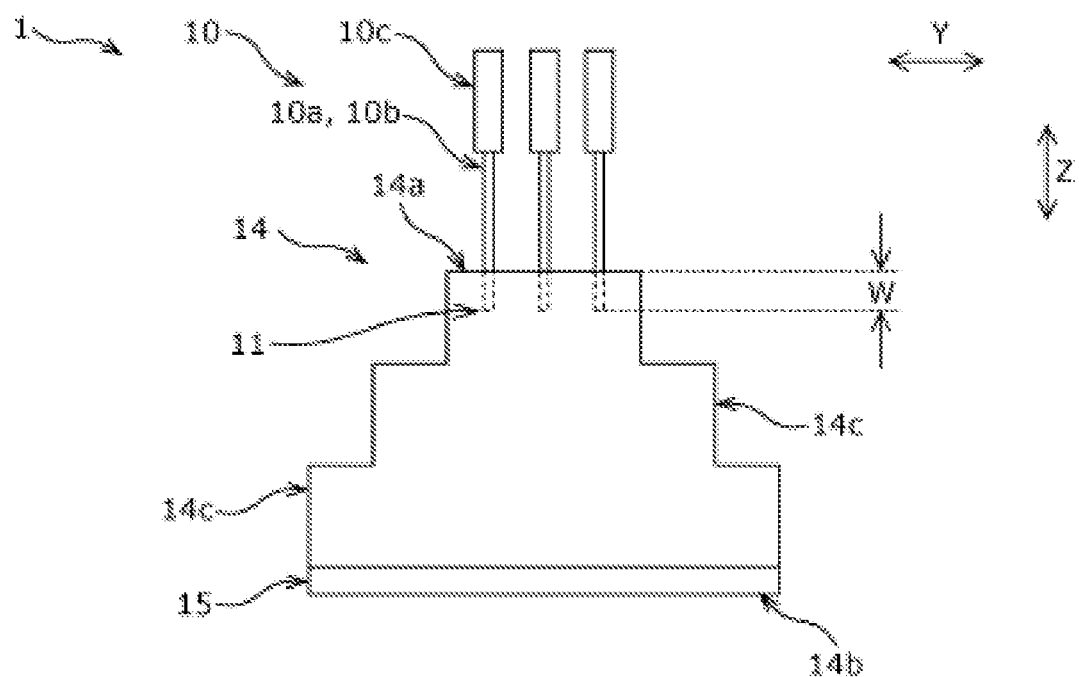
FIGS. 7 to 11 are schematic representations of different arrangements of glass fibers together with different optical elements from the side.

FIG. 7 is a schematic representation of glass fibers 10 together with an optical element 14 from the side. The glass fibers 10 are arranged in the transverse direction Y linearly adjacently and spaced apart from one another. The optical element 14 widens in the vertical direction Z from the incident face 14a to the exit face 14c in a stepped manner along all four side faces 14c. As a result, the weight and the volume of the optical element 14 can be reduced. The surface area of the incident face 14a of the optical element 14 can also be minimized, which can promote the process of melting the material of the optical element 14.

Figure 8:
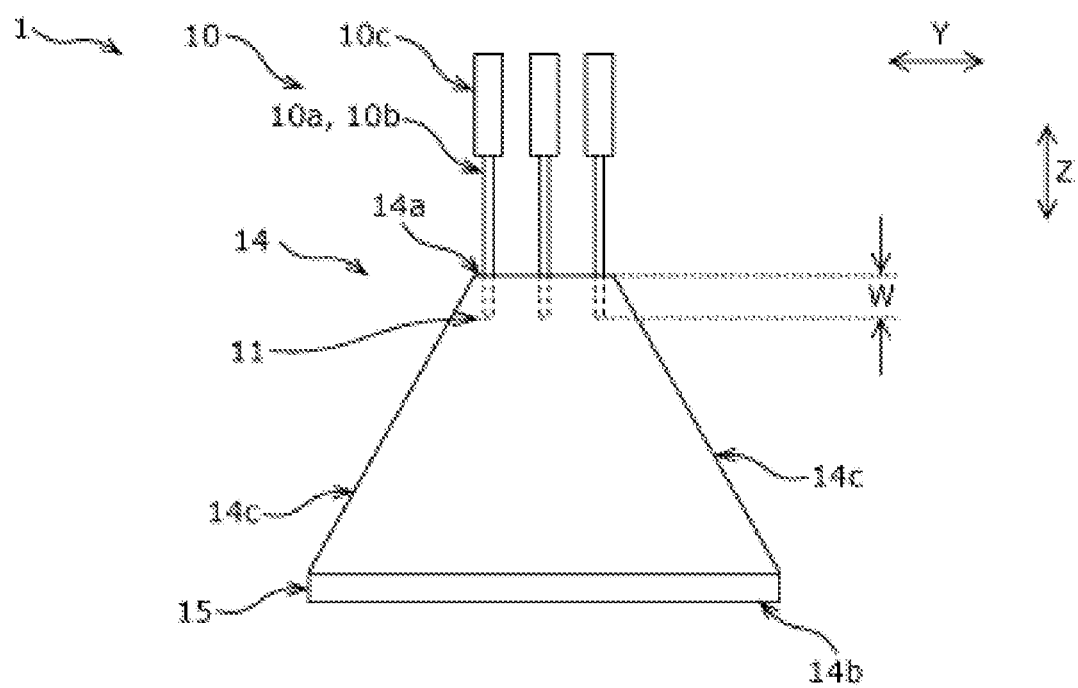

FIG. 8 is a schematic representation of glass fibers 10 together with an optical element 14 from the side. In contrast to FIG. 7, in this case the optical element 14 widens in the vertical direction Z from the incident face 14a to the exit face 14c so as to steplessly and continuously uniformly increase.

Figure 9:
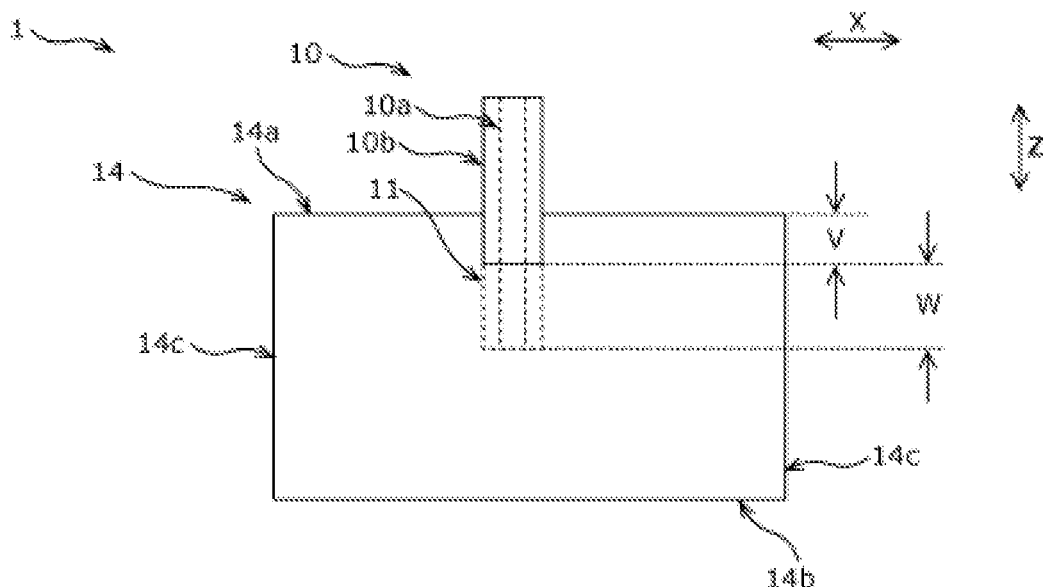

FIG. 9 is a schematic representation of glass fibers 10 together with an optical element 14 from the side. In this case, a groove-shaped recess 17, which has a depth V in the vertical direction Z, was made in the incident face 14a of the optical element 14 in the transverse direction Y. The depth of penetration W of the open ends 11 of the cores 10a and of the claddings 10b of the glass fibers 10 into the optical element 14 thus only starts at the bottom of the recess 17, so that the open ends 11 of the glass fibers 10 are spaced apart from the incident face 14a of the optical element 14 by the sum of the depth V and the depth of penetration W. This can increase the mechanical stability of the connection of the glass fibers 10 to the optical element 14 without having to melt the open ends 11 of the glass fibers 10 deeper into the material of the optical element 14.

Figure 10:
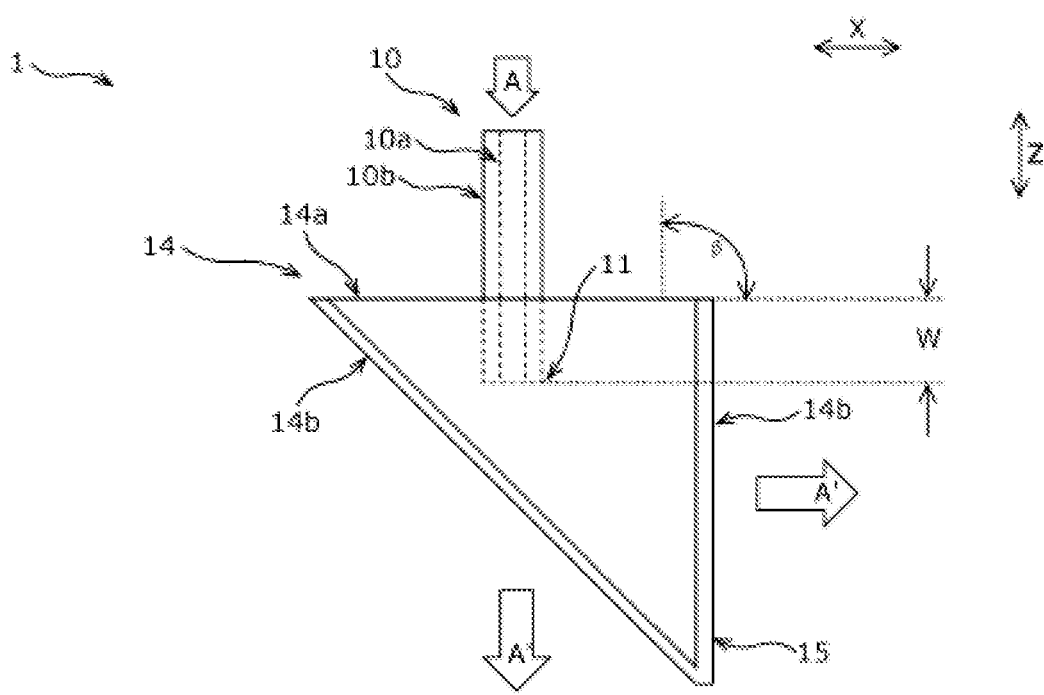

FIG. 10 is a schematic representation of glass fibers 10 together with an optical element 14 from the side. In this case, the glass fibers 10 are arranged linearly in the transverse direction Y. The optical element 14 has a triangular cross section in the plane of the longitudinal direction X of the vertical direction Z, such that the exit rays A' can exit the optical element 14 both in the longitudinal direction X to the right and to the left obliquely downward.

Figure 11:
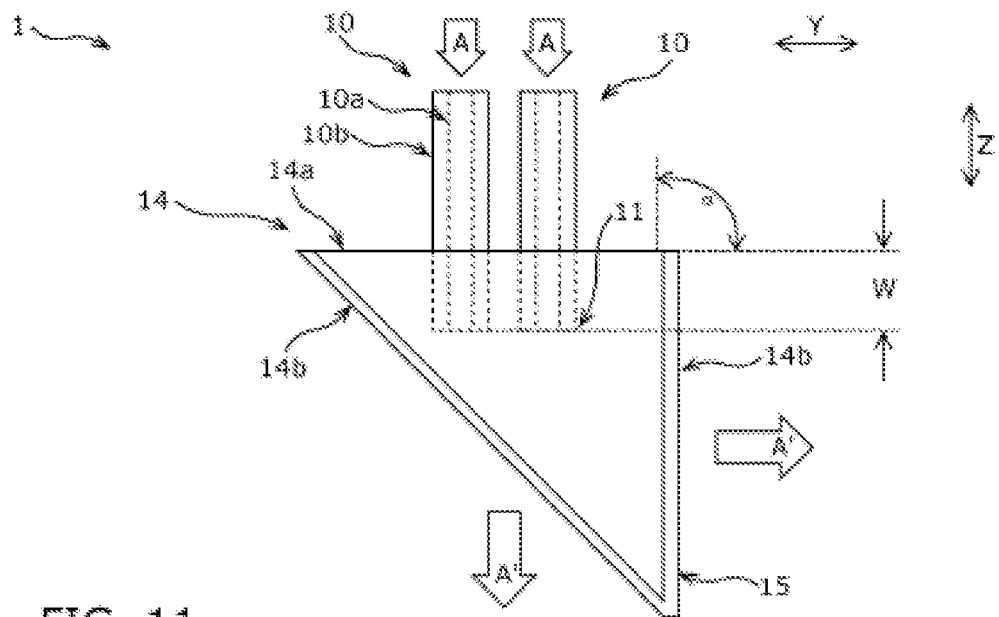

FIG. 11 is a schematic representation of glass fibers 10 together with an optical element 14 from the side. In this case, the glass fibers 10 are arranged linearly in the longitudinal direction X.

Figure 12:
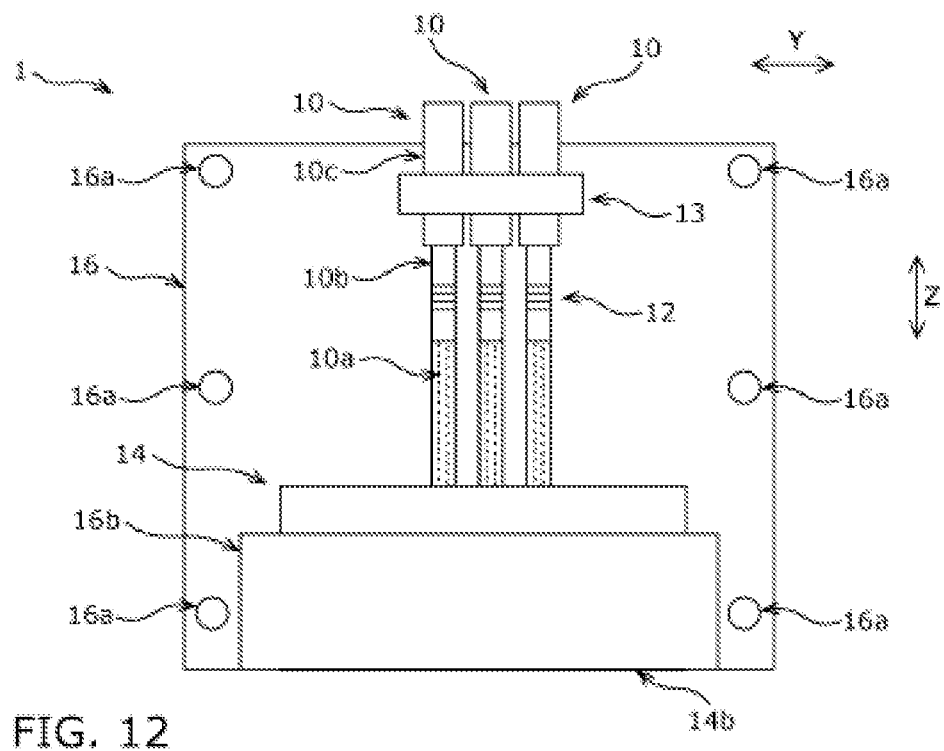
FIG. 12 is the representation of FIG. 1 with a housing.

FIG. 12 is the representation of FIG. 1 with a housing 16. The housing 16 can also be referred to as a housing plate 16, a rack 16, a fiber connector 16, a heat sink 16 or a frame 16. On the housing 16, the optical element 14 is held in a bow-shaped manner by a mount 16b such that the exit rays A' can exit undisturbed in the vertical direction Z downward; cf. FIG. 1. The glass fibers 10 are held by the housing 16 by means of the stress element 13, by the stress element 13 being glued to the housing 16 by means of adhesive. The housing 16 has a plurality of fastening elements 16a in the form of through openings 16a, in order to be mounted and held on a base by means of screws or the like through the through openings 16a. The housing 16 can be closed appropriately by means of a cover or the like (not shown). The radiation emitted via the pump light trap 12 can be received in the housing 16, including the cover, as a heat sink 16.

Figure 13:
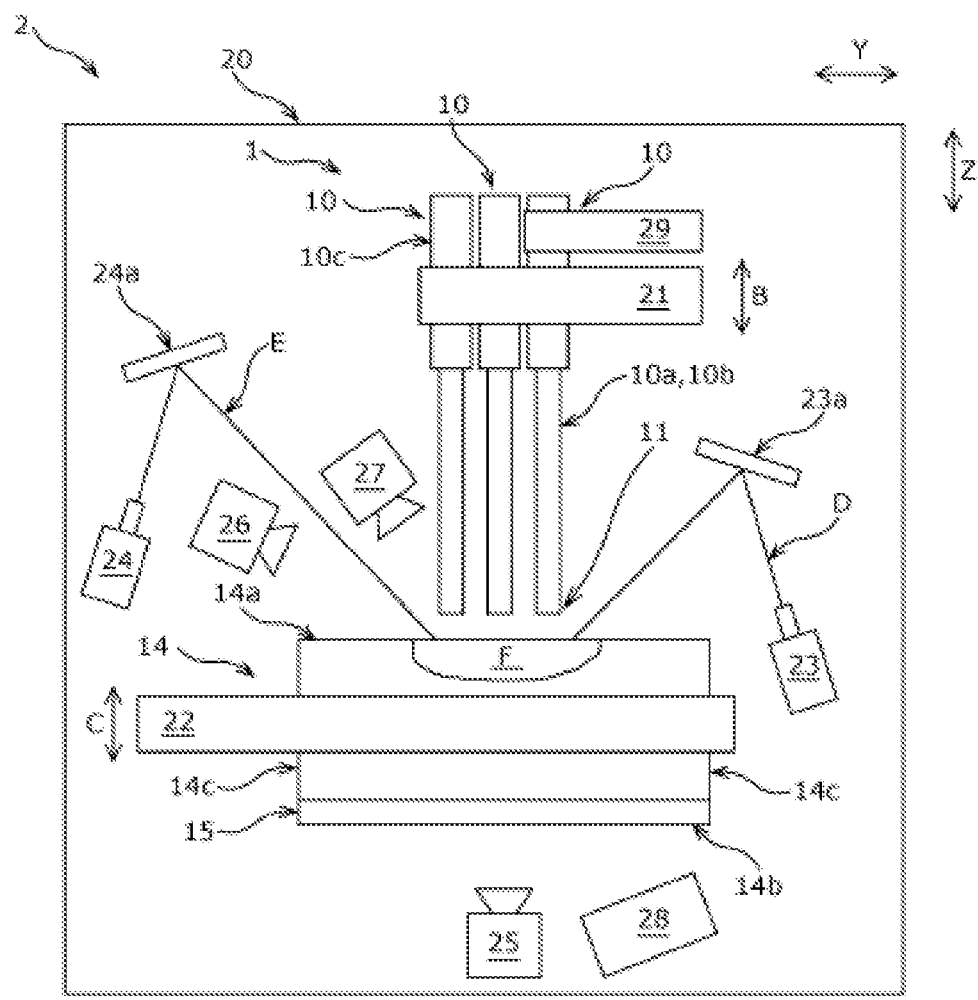
FIG. 13 is a schematic representation of a processing device according to the invention from the side.

FIG. 13 is a schematic representation of a processing device 2 according to the invention from the side. By means of such a processing device 2 according to the invention, the above-described fiber exit element 1, but also other fiber exit elements and comparable glass fiber components, can be produced or processed.

The processing device 2 has a housing 20 which holds the components or the component parts of the processing device 2 and encloses a work space (not specified) in which, for example, the fiber exit element 1 described above can be processed or produced. The work space can be locked and accessible to a person by means of a door or flap, for example.

A movable receiving unit 21 is provided, by which a plurality of glass fibers 10 can be received and held, preferably in the region of their coatings 10c, but optionally alternatively or additionally in the region of their claddings 10b, for example by means of a mechanical holding element, for example in the form of a gripper or the like, in order to be moved by the receiving unit 21 in the vertical direction Z at least in a direction of movement B. A movable receiving unit 22 is also provided, by which the optical element 14 can be received and held via its side faces 14c, for example by means of a mechanical holding element, for example in the form of a gripper or the like, in order to be moved by the receiving unit 22 in the vertical direction Z at least in a direction of movement C.

The processing device 2 also has a first processing beam source 23 in the form of a first $CO_2$ laser beam source 23, which can generate a first processing beam D in the form of a first $CO_2$ laser beam D. The first processing beam D is directed by the first processing beam source 23 onto a first movable alignment element 23a in the form of a first pivotable mirror 23a. The first movable alignment element 23a is correspondingly suspended on the housing 20 and can be adjusted by means of drives (not shown) such that the first processing beam D can be aligned with the incident face 14a of the optical element 14 by the first movable alignment element 23a. As a result, by means of the first processing beam D, a processing zone F of the incident face 14a of the optical element 14 and the material of the optical element 14 can be melted in this region and made flowable.

For this purpose, a second processing beam E in the form of a second $CO_2$ laser beam E can also be used in the transverse direction Y from the opposite side of the optical element 14, which beam is preferably generated by a second processing beam source 24 in the form of a second $CO_2$ laser beam source 24 and can be directed to the processing zone F by means of a second movable alignment element 24a in the form of a second pivotable mirror 24a. Alternatively, the second processing beam E can also emanate from the first processing beam source 23, for example by means of a beam splitter. The processing zone F can also be referred to as the heating zone F or the weld zone F.

This makes it possible for the processing device 2 to independently carry out a method for connecting the open ends 11 of the glass fibers 10 to the optical element 14 in accordance with a user-defined parameterization. If a person has arranged the glass fibers 10 in the movable receiving unit 21 and the optical element 14 in the moveable receiving unit 22, the processing or production process can be operated by the processing device 2 such that the processing zone F is heated so as to be flowable as described above. Once this temperature of the processing zone F has been reached, the glass fibers 10 and/or the optical element 14 can now be moved toward each other on one side or on both sides, the glass fibers being moved by their movable receiving unit 21 in the direction of movement B downward in the vertical direction Z and/or the optical element being moved by its movable receiving unit 22 in the direction of movement C upward in the vertical direction Z, so that the open ends 11 of the glass fibers 10 can penetrate the flowable material of the incident face 14a of the optical element 14 in the region of the processing zone F at the predetermined depth of penetration W. The heating of the processing zone F by means of the two processing beams D, E can have been ended beforehand or can continue.

When the depth of penetration W is reached, the heating of the processing zone F can be ended. Alternatively, the heating of the processing zone F can also be ended before the depth of penetration W is reached. The flowable material of the incident face 14a of the optical element 14 can in any case also melt the materials of the cores 10a and the claddings 10b of the glass fibers 10 in the region of the open ends 11 and thereby form an integral connection upon cooling.

The processing device 2 also has a first image capturing unit 25 in the form of a first array camera 25, which is arranged in the vertical direction Z centrally below the optical element 14 and is aligned with the exit face 14b of the optical element 14. Furthermore, the processing device 2 has a second image capturing unit 26 in the form of a second array camera 26, which is aligned in height Z obliquely from above with the processing zone F of the incident face 14a of the optical element 14. By means of the two image capturing units 25, 26, for example, a person, as a user, can visually monitor the glass fibers 10 and the optical element 14 before, during and after the connection process described above. If the movable receiving unit 21 of the glass fibers 10 and/or the movable receiving unit 22 of the optical element 14 is/are also designed to be movable in the horizontal plane X, Y, the open ends 11 of the glass fibers 10 can be aligned with respect to the optical element 14 by the user or also automatically by the processing device 2, simultaneously by means of the two image capturing units 25, 26.

The processing device 2 also has an alignment unit 29 in the form of a translationally and rotationally movable gripper 29, which can grip precisely one of the glass fibers 10, independently of the other glass fibers 10, in the region of its coating 10c and can align this fiber about the axis of its longitudinal extent with respect to the optical element 14. Between the individual glass fibers 10, the gripper 29 can be shifted in the transverse direction Y and in the longitudinal direction X in order to reach and align each glass fiber 10. In this way, predetermined alignment with respect to the optical element 14 can be made possible for each glass fiber 10, as a result of which, for example, in the case of polarization-maintaining glass fibers 10 and/or in the case of glass fibers 10 having stress cores, the optical properties of the signal output radiation can be influenced.

The processing device 2 also has a temperature detection unit 27 in the form of an infrared array camera 27, which is also aligned in height Z obliquely from above with the processing zone F of the incident face 14a of the optical element 14. The temperature detection unit 27 can be used to monitor, for example by the person, the heating of the processing zone F. The temperature detection unit 27 can, however, also be used by the processing device 2 to monitor the previously described process of heating the processing zone F and/or the previously described process of immersing the open ends 11 of the glass fibers 10 in the flowable material of the processing zone F of the incident face 14a of the optical element 14, and/or to carry out said heating process and/or said immersion process so as to be independently controlled in a closed-loop manner according to the detected temperature of the processing zone F.

Below the movable receiving unit 22 of the optical element 14, the processing device 2 also has a cooling unit 28 in the form of an air blower 28, which is aligned with the exit face 14b of the optical element 14. By means of the air blower 28, an air flow of ambient air can be generated and directed onto the exit face 14b of the optical element 14, such that heat can be actively dissipated from the optical element 14 outside the processing zone F. In this way, the heating of the optical element 14 outside the processing zone F can be minimized in a targeted manner.

By means of the processing device 2 or its two processing beams D, E, the previously described pump light traps 12 can also be introduced into the claddings 10b of the glass fibers 10 in a subsequent production step.

After completion of the production steps described above, the fiber exit element 1 can be removed by the user from the work space of the processing device 2 and provided with the stress element 13 in an additional production step.

LIST OF REFERENCE SIGNS (PART OF THE DESCRIPTION)

$\alpha$ First angle between the glass fibers 10 and the incident face 14a of the optical element 14
$\beta$ Second angle between the glass fibers 10 and the incident face 14a of the optical element 14
A Signal light rays; laser light rays
A' Exit rays
B Direction of movement of the receiving unit 21 of the glass fibers 10
C Direction of movement of the receiving unit 22 of the optical element 14
D First processing beam; first ($CO_2$) laser beam
E Second processing beam; second ($CO_2$) laser beam
F Processing, heating or weld zone of the optical element 14
V Depth of the recess 17 in the incident face 14a of the optical element 14
W Depth of penetration of the open ends 11 of the cores 10a of the glass fibers 10 into the optical element 14
X Longitudinal direction; depth; length
Y Transverse direction; width
Z Vertical direction; height
X, Y Horizontal; horizontal plane
1 Fiber exit element; signal light ray output; fiber exit optics, fiber array
10 Glass fibers
10a Cores of the glass fibers 10
10b Claddings of the glass fibers 10
10c Coatings of the glass fibers 10
11 Open ends of the cores 10a of the glass fibers 10
12 Pump light trap, cladding light remover, stripping elements or recesses in the claddings 10b of the glass fibers 10
13 Stress element
14 Optical element; optical window; optical lens, optical beam splitter; optical prism
14a Incident face of the optical element 14
14b Exit face of the optical element 14
14c Side faces of the optical element 14
15 Optical coating of the exit face 14b of the optical element 14; anti-reflective coating
16 Housing; housing plate; rack; fiber connector; heat sink; frame
16a Fastening elements; through openings
16b Mount of the optical element 14
17 Recess in the incident face 14a of the optical element 14
2 Processing device
20 Housing 21 Movable unit for receiving the glass fibers 10
22 Movable unit for receiving the optical element 14
23 First processing beam source; first (CO2) laser beam source
23a First movable alignment element or first pivotable mirror of the first processing beam D
24 Second processing beam source; second (CO2) laser beam source
24a Second movable alignment element or second pivotable mirror of the second processing beam E
25 First image capturing unit; first array camera
26 Second image capturing unit; second array camera
27 Temperature detection unit; infrared array camera
28 Cooling unit; air blower
29 Alignment unit; rotatable gripper

The invention claimed is:

1. Fiber exit element, comprising:
    a plurality of glass fibers each having at least one core which is designed to guide a signal light ray, the plurality of glass fibers being greater than two glass fibers; and
    at least one optical element, preferably an optical window, an optical lens, an optical beam splitter or an optical prism, which is connected to each open end of the cores of the glass fibers and is designed to receive the signal light ray from the open ends of the cores of the glass fibers and to output said signal light ray to the outside via at least one exit face as exit rays,
characterized in that
    the open ends of the cores of the glass fibers, preferably also the open ends of claddings of the glass fibers substantially enclosing the cores, are each arranged within the material of the optical element with a depth of penetration, preferably with respect to an incident face of the optical element,
    at least the material of the open ends of the cores of the glass fibers, preferably also the material of the open ends of the claddings of the glass fibers, being fused to the material of the optical element.

2. Fiber exit element according to claim 1, characterized in that
    the optical element, in the region of an incident face, is connected to at least some, preferably to all, of the open ends of the cores of the glass fibers, preferably also to the open ends of claddings of the glass fibers substantially enclosing the cores,
    the optical element being designed to increasingly widen at least in portions, preferably completely, preferably in a stepped manner or continuously, from the incident face to the exit face.

3. Fiber exit element according to claim 2, characterized in that
    the incident face and the exit face of the optical element are aligned in parallel or at an angle with respect to one another.

4. Fiber exit element according to claim 2, characterized in that
    at least the incident face of the optical element, preferably all outer faces of the optical element except for the exit face of the optical element, is designed to be optically roughened and
    at least the exit face of the optical element, preferably precisely the exit face of the optical element, is designed to have an optically smooth surface finish.

5. Fiber exit element according to claim 1, characterized in that
    the optical element, preferably an incident face of the optical element, has at least one recess having a depth,
    at least some, preferably all, of the open ends of the cores of the glass fibers, preferably also the material of the claddings of the glass fibers substantially surrounding the cores, being arranged within the material of the optical element with the depth of penetration with respect to the recess.

6. Fiber exit element according to claim 1, characterized in that
    at least one exit face of the optical element has, at least in portions, preferably over the entire surface, an optical coating, preferably an optical anti-reflective coating.

7. Fiber exit element according to claim 1, characterized in that
    at least one, preferably some, particularly preferably all, of the glass fibers has at least one cladding substantially enclosing the core,
    at least one pump light trap, preferably in the form of recesses, being formed in the material of the cladding of the glass fiber in the region of the fiber exit element, in order to guide cladding light away from the cladding of the glass fiber to outside the glass fiber.

8. Fiber exit element according to any claim 1, characterized by at least one stress element in the region of the fiber exit element, which stress element is designed to exert mechanical stress, preferably in the form of tensile forces, compressive forces, bending forces and/or shear forces, on at least the core of one, preferably some, particularly preferably all, of the glass fibers, preferably and on a cladding of the glass fiber substantially enclosing the core, over a predetermined portion of the longitudinal extent of the glass fibers.

9. Fiber exit element according to claim 1, characterized in that
    the open end of the core of at least one, preferably some, particularly preferably all, of the glass fibers is arranged at least at a first angle with respect to an incident face of the optical element,
    the first angle being 90° or different from 90°,
    the open ends of the cores of some, preferably all, of the glass fibers preferably having the same first angle or different first angles.

10. Fiber exit element according to claim 9, characterized in that
    the open end of the core of at least one, preferably some, particularly preferably all, of the glass fibers is also arranged at a second angle with respect to an incident face of the optical element,
    the second angle being 90° or different from 90°,
    the open ends of the cores of some, preferably all, of the glass fibers preferably having the same second angle or different second angles, and/or
    the first angle and the second angle preferably being the same or different.

11. Fiber exit element according to claim 1, characterized in that
    at least some, preferably all, of the open ends of the cores of the glass fibers, preferably also the open ends of the claddings of the glass fibers substantially enclosing the cores, are each arranged within the material of the optical element with the same depth of penetration or with a different depth of penetration.

12. Fiber exit element according to claim 1, characterized in that at least one, preferably some, particularly preferably all, of the glass fibers can be aligned about the axis of its longitudinal extent and is arranged in a preferred alignment.

13. Fiber exit element according to claim 1, characterized in that at least some, preferably all, of the open ends of the cores of the glass fibers are arranged in a linear, V-shaped, circular, semicircular, arcuate, bundle-like, hollow-cylindrical or rectangular manner with respect to one another.

14. Fiber exit element according to claim 1, characterized in that at least the open end of the core of one of the glass fibers is arranged so as to form a center of a circle, at least some, preferably all, of the open ends of the cores of the glass fibers being arranged in a circle around the center of the circle, preferably at least one radially inner circle and one radially outer circle being formed and/or preferably all of the open ends of the cores of the glass fibers, preferably all of the claddings of the glass fibers substantially enclosing the cores, being arranged equally or differently spaced apart or in contact with one another.

15. Fiber exit element according to claim 1, characterized in that at least some, preferably all, of the open ends of the cores of the glass fibers, preferably all of the claddings of the glass fibers substantially enclosing the cores, are arranged equally or differently spaced apart or in contact with one another.

16. Fiber exit element according to claim 1, characterized in that at least some, preferably all, of the cores of the glass fibers, preferably and/or some, preferably all of the claddings of the glass fibers substantially enclosing the cores, have, at least in the region of the fiber exit element, a constant or different diameter and/or a constant or different cross section in their longitudinal extent direction.

17. Fiber exit element according to claim 1, characterized in that at least some, preferably all, of the cores of the glass fibers, preferably and/or some, preferably all, the claddings of the glass fibers substantially enclosing the cores, have the same or different materials and/or the same or different diameters and/or the same or different cross sections, preferably circular, rectangular, square or octagonal.

18. Method for producing a fiber exit element, comprising at least the steps of:

providing a plurality of glass fibers each having at least one core which is designed to guide a signal light ray, the plurality of glass fibers being greater than two glass fibers;

providing at least one optical element, preferably an optical window, an optical lens, an optical beam splitter or an optical prism, which is designed to receive the signal light ray from open ends of the cores of the glass fibers and to output said signal light ray to the outside via at least one exit face as exit rays;

aligning at least one first processing beam with at least one processing zone of the optical element;

heating at least the processing zone of the optical element by means of at least the first processing beam such that the material of the optical element has, at least in the processing zone, sufficient flowability to receive therein the open ends of the cores of the glass fibers, preferably also the open ends of the claddings of the glass fibers substantially enclosing the cores; and moving at least the glass fibers and/or the optical element toward one another such that the open ends of the cores of the glass fibers, preferably also the open ends of the claddings of the glass fibers, penetrate the material of the optical element in the processing zone of the optical element with a depth of penetration, and at least the material of the open ends of the cores of the glass fibers, preferably also the material of the open ends of the claddings of the glass fibers, is fused to the material of the optical element.

19. Processing device for producing a fiber exit element, comprising:

at least one receiving unit for receiving a plurality of glass fibers, each comprising at least one core which is designed to guide a signal light ray, the plurality of glass fibers being greater than two glass fibers;

at least one receiving unit for receiving at least one optical element, preferably an optical window, an optical lens, an optical beam splitter or an optical prism, which is designed to receive the signal light ray from open ends of the cores of the glass fibers and to output said signal light ray to the outside via an exit face as an exit ray; and at least one first processing beam source, preferably a first laser beam source, particularly preferably a first $CO_2$ laser beam source, which is designed to generate a first processing beam and, directly or indirectly by means of a first movable alignment element, preferably by means of a first pivotable mirror, to direct said beam at a processing zone of the optical element, to move said beam in the processing zone, and to heat the processing zone of the optical element in such a way that the material of the optical element has, at least in the processing zone, sufficient flowability to receive therein the open ends of the cores of the glass fibers, preferably also the open ends of claddings of the glass fibers substantially enclosing the cores, wherein the receiving unit for receiving at least the glass fibers and/or the receiving unit for receiving at least the optical element is/are movable toward one another, in a direction of movement and in a direction of movement, respectively, in such a way that at least the glass fibers and/or the optical element can be moved toward one another such that the open ends of the cores of the glass fibers, preferably also the open ends of the claddings of the glass fibers penetrate the material of the optical element in the processing zone of the optical element with a depth of penetration, and at least the material of the open ends of the cores of the glass fibers, preferably also the material of the open ends of the claddings of the glass fibers, can be fused to the material of the optical element.

\* \* \* \* \*